(12) United States Patent
Lue et al.

(10) Patent No.: US 12,437,820 B2
(45) Date of Patent: Oct. 7, 2025

(54) MEMORY INCLUDING THERMAL ANNEAL CIRCUITS AND METHODS FOR OPERATING THE SAME

(71) Applicant: MACRONIX INTERNATIONAL CO., LTD., Hsinchu (TW)

(72) Inventors: Hang-Ting Lue, Hsinchu (TW); Teng-Hao Yeh, Hsinchu (TW); Wei-Chen Chen, Taoyuan (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 244 days.

(21) Appl. No.: 18/199,308

(22) Filed: May 18, 2023

(65) Prior Publication Data

US 2024/0386976 A1    Nov. 21, 2024

(51) Int. Cl.
*G11C 16/34* (2006.01)
*G11C 16/08* (2006.01)
(Continued)

(52) U.S. Cl.
CPC .......... *G11C 16/3495* (2013.01); *G11C 16/08* (2013.01); *G11C 16/16* (2013.01); *G11C 16/30* (2013.01)

(58) Field of Classification Search
CPC ..... G11C 16/3495; G11C 16/08; G11C 16/16; G11C 16/30; G11C 5/145; G11C 16/0483;
(Continued)

(56) References Cited

U.S. PATENT DOCUMENTS 8,488,387 B2    7/2013  Lue et al.
8,824,212 B2    9/2014  Lue
(Continued)

FOREIGN PATENT DOCUMENTS

TW    201236110 A    9/2012
TW    201250689 A    12/2012

OTHER PUBLICATIONS

Lue, et al., "Investigation of Methods That Greatly Improve 3D Nor Flash to Either Gain Superb Retention or Become DRAM-like with High Endurance (>1G cycling) and High Write-bandwidth (>4Gb/s)," 2021 IEEE International Electron Devices Meeting (IEDM), San Francisco, CA, USA, Dec. 11-16, 2021, pp. 10.3.1-10.3.4.

(Continued)

*Primary Examiner* — Amir Zarabian
*Assistant Examiner* — Bradley S Coon
(74) *Attorney, Agent, or Firm* — Andew L. Dunlap; Haynes Beffel & Wolfeld LLP

(57) ABSTRACT

An array of memory cells includes a resistive component disposed in thermal communication with a group of memory cells in the array of memory cells. A capacitor and a circuit to cause discharge of the capacitor via the resistive component induces thermal anneal of the group of memory cells. A charge pump and a circuit to enable the charge pump to precharge the capacitor can be used. The charge pump, the capacitor and the array of memory cells can be disposed on a single integrated circuit. The group of memory cells can be arranged in a 3D stack having multiple levels, and the resistive component can be "snaked" through the stack. The thermal anneal can be executing in timing coordination with erase operations in flash memory.

18 Claims, 26 Drawing Sheets

(51) Int. Cl.
*G11C 16/16* (2006.01)
*G11C 16/30* (2006.01)

(58) Field of Classification Search
CPC ........ H10B 43/40; H10B 43/10; H10B 43/20;
H10B 43/50; H10B 43/30; H10B 41/10;
H10B 41/27; H10B 41/30; H10B 41/40;
H10B 43/27; H10D 1/47; H10D 1/692
See application file for complete search history.

(56) References Cited

U.S. PATENT DOCUMENTS

| | | |
|---|---|---|
| 9,716,137 B1 | 7/2017 | Hu et al. |
| 10,388,720 B2 | 8/2019 | Lue et al. |
| 10,777,566 B2 | 9/2020 | Lue |
| 10,910,393 B2 | 2/2021 | Lai et al. |
| 11,133,329 B2 | 9/2021 | Lue |
| 2011/0299317 A1 | 12/2011 | Shaeffer et al. |
| 2012/0281481 A1* | 11/2012 | Lue .................... G11C 16/0483 365/185.23 |
| 2013/0130468 A1 | 5/2013 | Higashitani et al. |
| 2013/0148437 A1 | 6/2013 | Bronner et al. |
| 2013/0242673 A1 | 9/2013 | Luthra |
| 2018/0047739 A1* | 2/2018 | Dorhout ................. H10B 41/10 |
| 2019/0371414 A1* | 12/2019 | Nguyen ................ G11C 16/08 |
| 2021/0233586 A1 | 7/2021 | Tailliet et al. |
| 2022/0189512 A1* | 6/2022 | Iwasaki .............. G11C 16/3418 |

OTHER PUBLICATIONS

Lue et al., "Radically extending the cycling endurance of Flash memory (to > 100M Cycles) by using built-in thermal annealing to self-heal the stress-induced damage," 2012 International Electron Devices Meeting, San Francisco, CA, USA, Dec. 10-13, 2012, pp. 9.1.1-9.1.4.

* cited by examiner

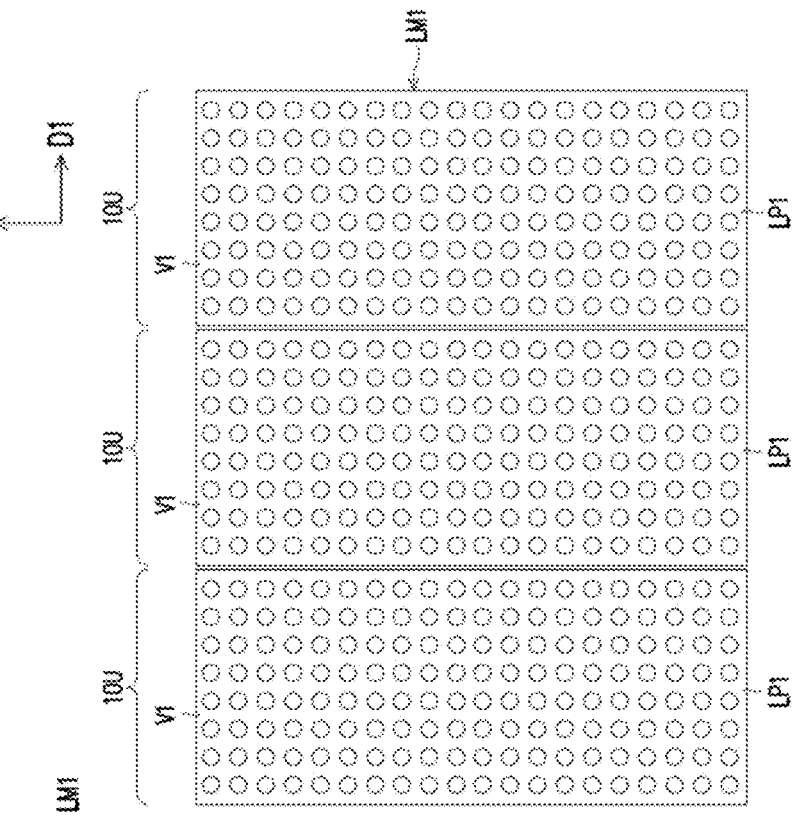
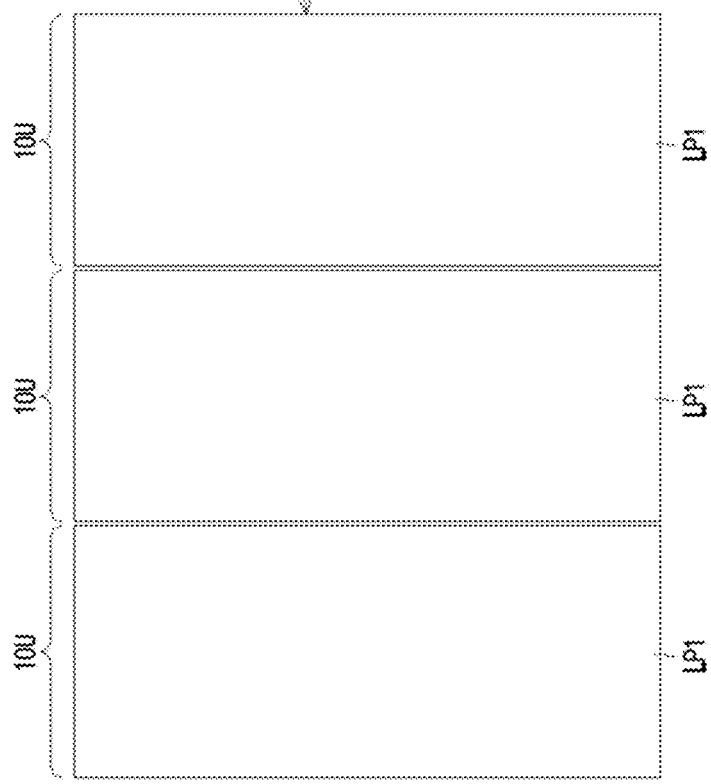
FIG. 3B
FIG. 3A

MEMORY INCLUDING THERMAL ANNEAL CIRCUITS AND METHODS FOR OPERATING THE SAME

BACKGROUND

Technical Field

Technology is described relating to integrated circuit memory, including nonvolatile memory such as flash memory, and methods for operating the same.

Description of Related Art

Flash memory is a class of nonvolatile integrated circuit memory technology. The typical flash memory cell consists of a field effect transistor FET structure having a source and drain separated by a channel, and a gate separated from the channel by a charge storage structure including a tunnel dielectric layer, the charge storage layer (floating gate or dielectric), and a blocking dielectric layer. According to the early conventional charge trapping memory designs referred to as SONOS devices, the source, drain and channel are formed in a silicon substrate(S), the tunnel dielectric layer is formed of silicon oxide (O), the charge storage layer is formed of silicon nitride (N), the blocking dielectric layer is formed of silicon oxide (O), and the gate comprises poly-silicon(S). More advanced flash memory technology has been developed, using bandgap engineered tunneling dielectrics in dielectric charge trapping cells.

High density memory technologies such as dielectric charge trapping memory, phase change memory, ferroelectric memory, magneto-electric memory and others, have been implemented using 3D structures, including multiple layers of memory cells, in a variety of configurations.

These advanced types of memory technology can have limited endurance and operation speeds, compared to other memory types and structures.

It is desirable to provide technology improving the endurance and speed of operation of integrated circuit memory, including memories implemented using 3D structures.

SUMMARY

A memory is described which can have high endurance based on applying thermal anneal operations that "heal" memory cells that could degrade over time.

Technology is described, comprising an array of memory cells; a resistive component disposed in thermal communication with a group of memory cells in the array of memory cells; a capacitor; and a circuit to cause discharge of the capacitor via the resistive component to induce thermal anneal of the group of memory cells.

In embodiments of the technology, the memory further comprises a charge pump; and a circuit to enable the charge pump to precharge the capacitor. The charge pump, the capacitor and the array of memory cells can be disposed on a single integrated circuit.

The group of memory cells can be arranged in a 3D stack having multiple levels, and the resistive component can be "snaked" through the stack.

The group of memory cells can be arranged in a 3D stack having multiple levels, and the resistive component can include a bottom conductor plate beneath the group of cells in the 3D stack, a first vertical conductor connected to the bottom conductor plate and disposed in a first via through the stack, and a second vertical conductor connected to the bottom conductor plate and disposed in a second via through the stack.

The memory can include a plurality of groups of memory cells in the array of memory cells, and a plurality of resistive components disposed in thermal communication with respective groups of memory cells in the plurality of groups of memory cells. The technology can include a decoder to connect the capacitor to selected resistive components in the plurality of resistive components.

In embodiments of the technology, the discharge current of the capacitor provides a current spike including sufficient current for the thermal anneal in a short interval, such as on the order of 10 microseconds. Also, to support generation of the current spike, the capacitor has relatively high capacitance. For example, the capacitor can have a capacitance greater than 10 nF. In embodiments described herein the capacitor can have a capacitance of 30 nF or more.

The memory can be disposed on an integrated circuit, or in a memory circuit including a controller configured to execute erase operations for memory cells in the array. In embodiments described herein, the controller can control the circuit to enable discharge of the capacitor to induce thermal anneal of the group of memory cells in timing coordination with an erase operation to erase the group of memory cells. Also, the controller can otherwise be triggered by the erase operation to enable the thermal anneal cycle.

A memory is described in which the group of memory cells, subject of the thermal anneal, is disposed in a heater block of the array of memory cells, the heater block including one or more segments. Each segment includes a plurality of word line layers, separate from the word line layers in adjacent segments. Also, each segment includes a plurality of bit line pillars disposed through the plurality of word line layers, forming vertical memory cells columns.

The memory can include a plurality of groups of memory cells including said first mentioned group of memory cells, the groups in the plurality of groups disposed in respective heater blocks of the array of memory cells. The heater blocks can be selectable using a decoder to receive discharge current from the capacitor for thermal anneal of the group of memory cells in the selected heater block.

As described herein, the technology is applied to 3D AND-type NOR flash memory.

A method is described for operating a memory, where the memory includes a group of memory cells disposed in thermal communication with a resistive component, where the method comprises charging a capacitor; and applying discharge current from the capacitor to a resistive component in thermal communication with the group of memory cells.

In embodiments described herein, the method includes executing an erase operation to erase the group of memory cells; and applying said discharge current in timing coordination with the erase operation.

In embodiments described herein, the method includes executing an erase operation to erase the group of memory cells; and applying said discharge current triggered by the erase operation.

In embodiments described herein, where the memory includes a plurality of groups of memory cells arranged in thermal communication with respective resistive components, the method includes using a decoder to select the group of memory cells.

Other aspects and advantages of the present technology can be seen on review of the drawings, the detailed description and the claims, which follow.

BRIEF DESCRIPTION OF THE DRAWINGS

FIGS. 2F, 2G, 2H, 2I, 2J, 2K are cross-sectional views illustrating a 3D AND-type NOR flash memory having a heater according to some embodiments of the present technology.

FIGS. 3A, 3B, 3C, 3D, 3E, 3F, 3G are cross-sectional views of a manufacturing process of a 3D AND-type NOR flash memory device according to an embodiment of the present technology.

DESCRIPTION OF THE EMBODIMENTS

Figure 1:
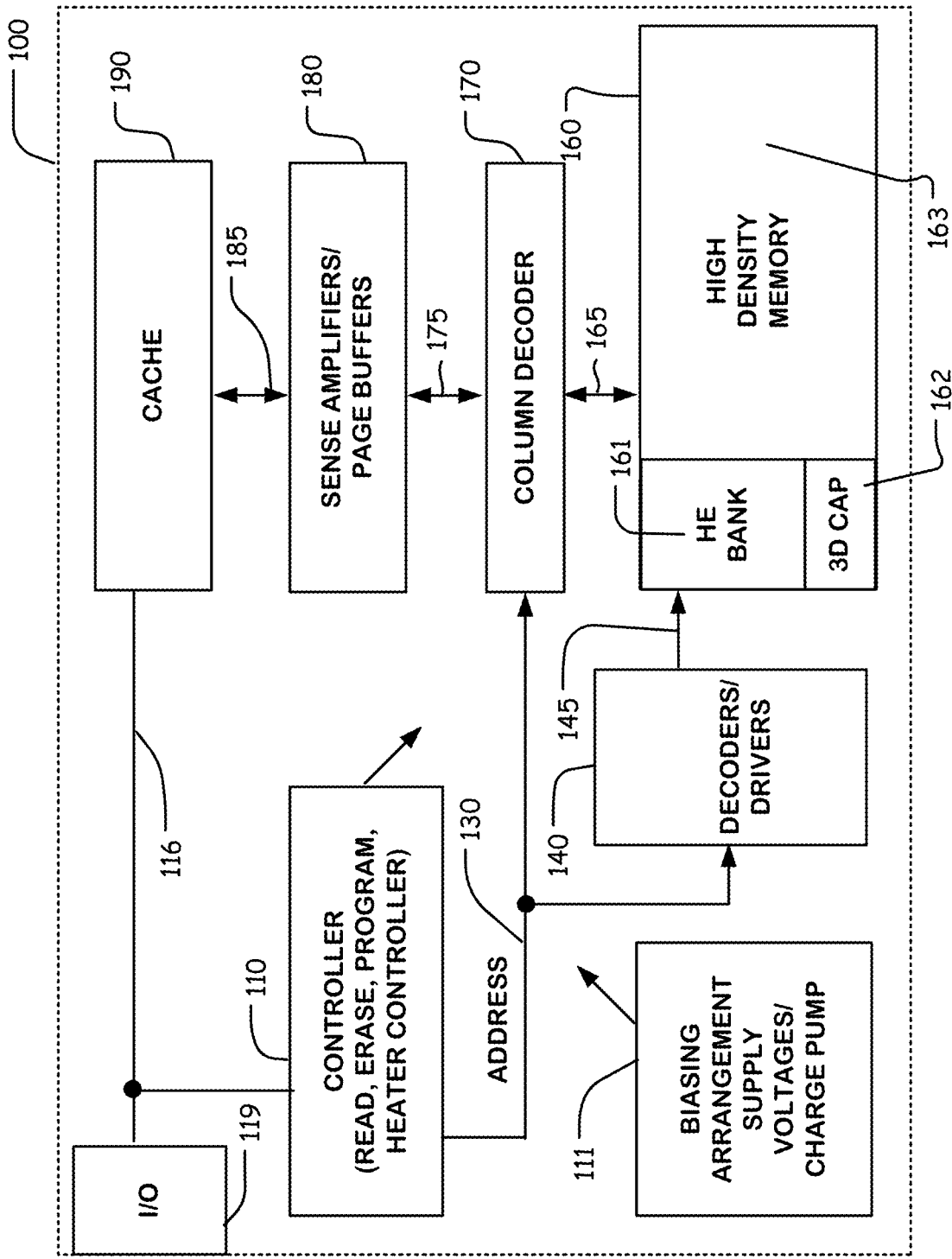
FIG. 1 is a simplified block diagram of an integrated circuit memory including an array of memory cells configured for thermal anneal as described herein.

FIG. 1 is a simplified block diagram of an integrated circuit memory device 100 including a 3D memory array 160, with a high endurance bank 161 (HE BANK) configured for thermal anneal, a 3D capacitor bank 162 and a high density bank 163. The memory device 100 includes a capacitor, such as a 3D capacitor 162 which can be implemented using 3D structures like those used to implement the memory 160. The capacitor can be configured for generating drive current for the thermal anneal, and can have high capacitance to support current levels needed for thermal anneal operations. The high endurance bank 161 can be configured as a special status register, for example, to reliably hold status data in conditions in which the high density bank 163 may be less reliable.

Although the technology can be applied in a variety of types of memory arrays, examples described herein include 3D flash memory. The 3D flash memory may be a 3D AND-type NOR flash memory, a 3D NAND-type flash memory or a 3D NOR-type flash memory. In an example of an AND-type NOR flash structure, memory transistors are arranged along source line and drain-connected bitline pairs running orthogonally to the word line. This architecture allows source lines to be separately decoded for access to smaller groups of memory transistors, such as bytes.

The memory device 100 includes peripheral circuitry supporting the 3D memory array 160. The peripheral circuitry includes a controller 110 including logic circuits, such as state machines and the like, used for execution of operations necessary for the device, including in some examples command decoding, read, erase and program operations, input/output operations, address generation, memory management and so on. In this example the controller also supports operations to apply thermal anneal operations to portions of the array, such as the high endurance bank 161. The peripheral circuitry includes biasing arrangement supply voltages circuit 111 which generates and distributes bias voltages and supply voltages throughout the integrated circuit for use in the memory operations and otherwise. As noted in the figure, the supply voltages circuit 111 can include a charge pump circuit. The charge pump circuit can be configured to precharge the capacitor 162 to relatively high voltages, compared to the external supply voltage. Also, an input/output I/O circuit 119 is provided.

In this example, addresses are provided by the controller 110 on line 130 distributed to a column decoder 170 which is coupled to data lines 165 from the 3D memory array 160 and to a decoder/driver 140 for rows in the 3D memory array 160 which is coupled to word lines 145 in this example. Also the decoder/drivers 140 are coupled to thermal units in the high endurance bank 161 of the array 160, examples of which are described in more detail below. The column decoder 170 is coupled to sense amplifiers and page buffers 180 by line 175. Sense amplifiers and page buffers 180 are coupled by line 185 to a cache 190 in this example. The cache 190 is coupled to an input/output circuit 119 via line 116.

In the technology described herein, at least some of the peripheral circuitry is implemented under the 3D memory array 160. This can be accomplished using, for example, CMOS under array circuit structures. The 3D memory array 160, in examples described below, comprises a memory structure including a plurality of stacks of conductors which are configured in the examples described below as word lines. For connection to the circuitry under the 3D memory array 160, a plurality of through-stack vias TSVs are implemented in contact regions of the memory structure.

In examples of the technology, the on-chip capacitor can be characterized as a Super Capacitor, because of the high capacitance such as 10 to 30 nF, capable of discharging a large current for the heater structure.

Use of capacitive discharge to provide heater current can reduce the chip power burden, which would be created by alternatives based on high voltage and high current charge-pumping circuits.

FIGS. 2A to 2D illustrate a 3D memory structure suitable for an AND-type NOR flash memory device suitable for use in an integrated circuit as described herein for both the high density array and the high endurance bank of the array.

Figure 2A:
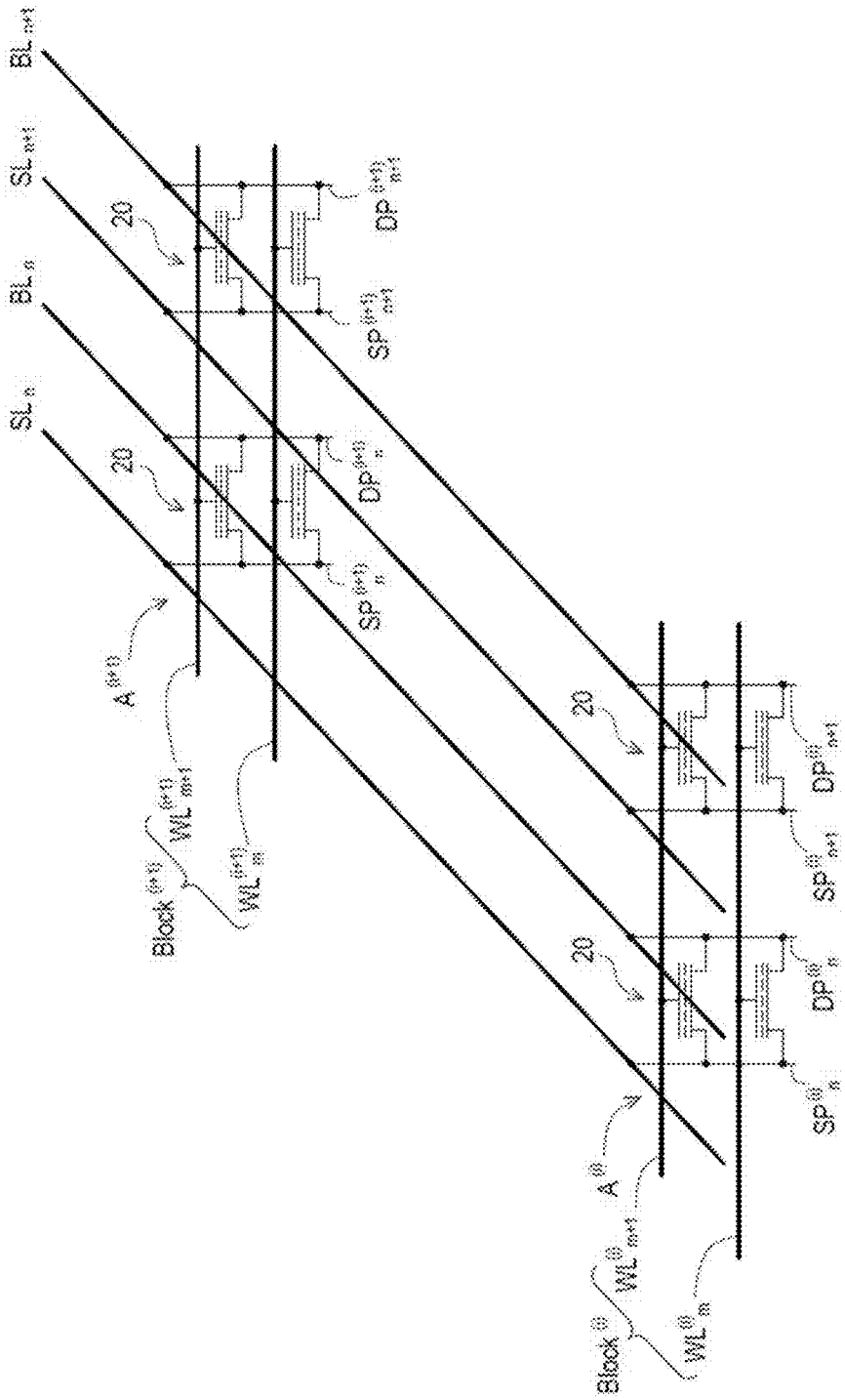
FIG. 2A shows a circuit diagram of a 3D AND-type NOR flash memory array according to some embodiments according to the present technology.
Figure 2C:
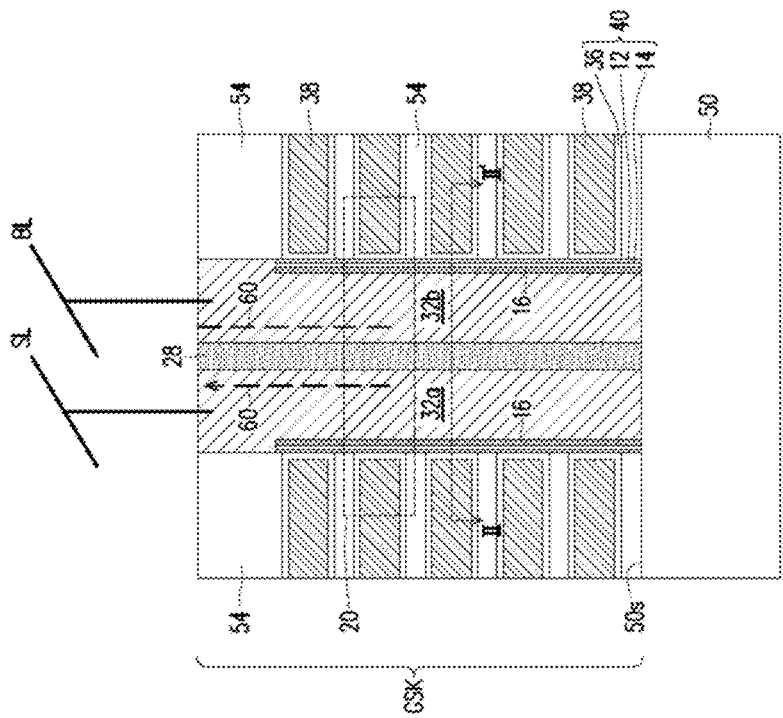
FIG. 2C and FIG. 2D show cross-sectional views taken along line I-I' of FIG. 2B.
Figure 2B:
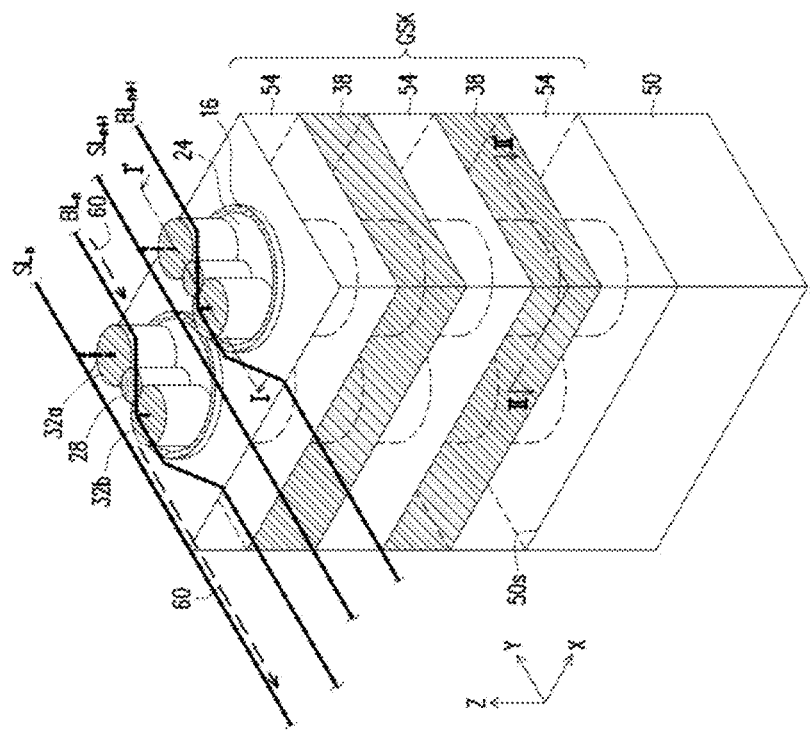
FIG. 2B shows a partial 3D view of the memory array in FIG. 2A.
Figure 2E:
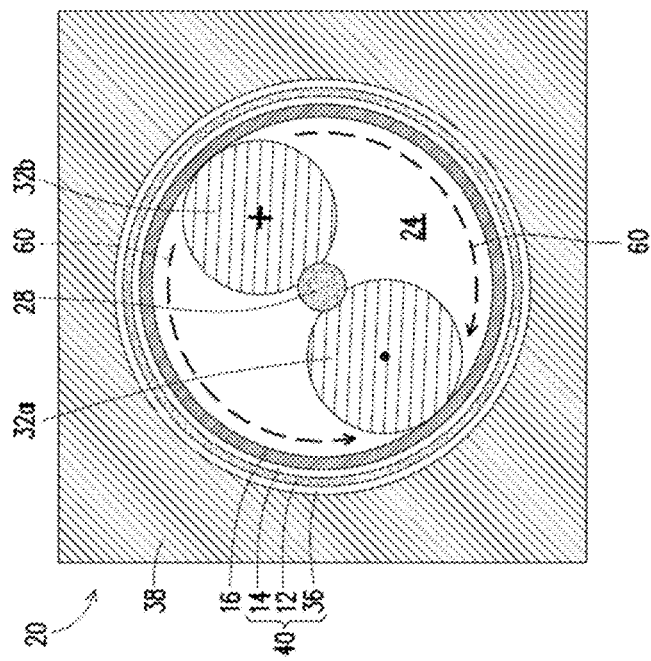
FIG. 2E shows a top view of line II-II' of FIG. 2B, FIG. 2C and FIG. 2D.
Figure 2D:
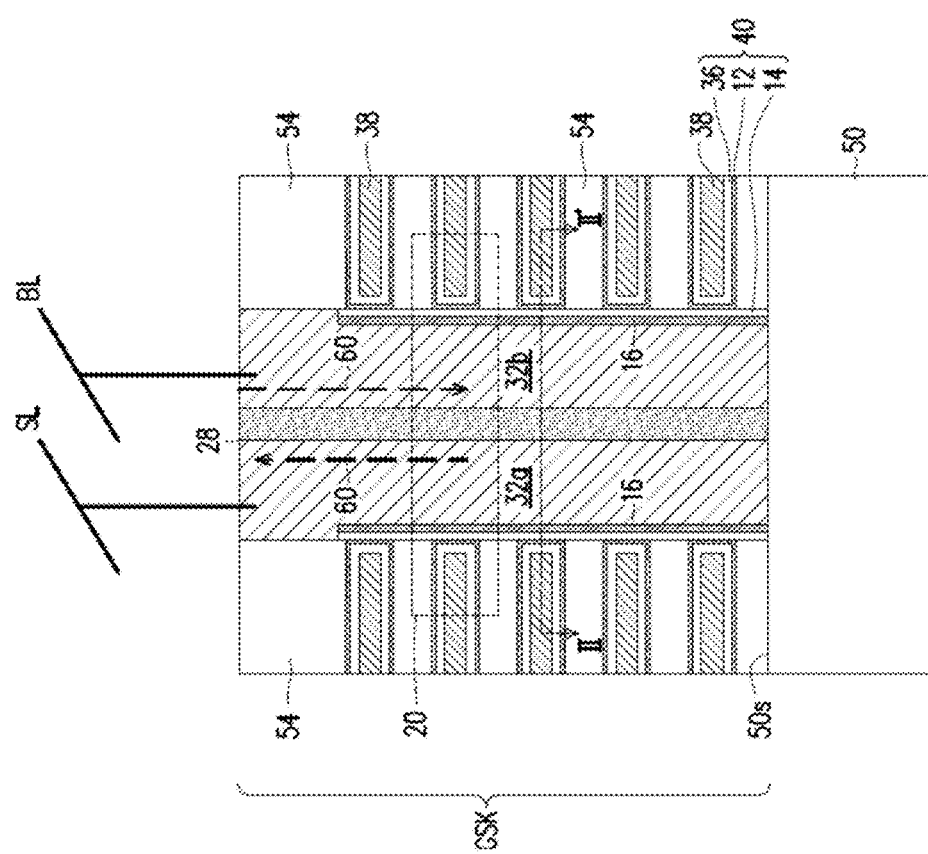

FIG. 2A shows a circuit diagram of a 3D AND-type NOR flash memory array according to some embodiments according to the present disclosure. FIG. 2B shows a partial three dimensional view of the memory array in FIG. 2A. FIG. 2C and FIG. 2D show cross-sectional views taken along line I-I' of FIG. 2B. FIG. 2E shows a top view of line II-II' of FIG. 2B, FIG. 2C and FIG. 2D.

FIG. 2A shows a schematic view of two blocks BLOCK(i) and BLOCK(i+1) of a vertical memory array arranged in rows and columns. The block BLOCK(i) includes a memory array A(i). A row (e.g., an (m+1)th row) of the memory array A(i) is a set of memory cells 20 having a common word line (e.g., WL(i)m+1). The memory cells 20 of the memory array A(i) in each row (e.g., the (m+1)th row) correspond to a common word line (e.g., WL(i)m+1) and are coupled to different source pillars (e.g., SP(i)n and SP(i)n+1) and drain pillars (e.g., DP(i)n and DP(i)n+1), so that the memory cells 20 are logically arranged in a row along the common word line (e.g., WL(i)m+1).

A column (e.g., an nth column) of the memory array A(i) is a set of memory cells 20 having a local source pillar (e.g., SP(i)n) and a local drain pillar (e.g., DP(i)n). The memory cells 20 of the memory array A(i) in each column (e.g., the nth column) correspond to different word lines (e.g., WL(i) m+1 and WL(i)m) and are coupled to a local source pillar (e.g., SP(i)n) and a local drain pillar (e.g., DP(i)n). Hence, the memory cells 20 of the memory array A(i) are logically arranged in a column along the local source pillar (e.g., SP(i)n) and the local drain pillar (e.g., DP(i)n). In the physical layout, according to the manufacturing method as applied, the columns or rows may be twisted and arranged in a honeycomb pattern or other patterns for high density or other reasons.

In FIG. 2A, in the block BLOCK(i), the memory cells 20 in the nth column of the memory array A(i) share a local source pillar (e.g., SP(i)n) and a local drain pillar (e.g., DP(i)n). The memory cells 20 in an (n+1)th column share a local source pillar (e.g., SP(i)n+1) and a local drain pillar (e.g., DP(i)n+1).

The local source pillar (e.g., SP(i)n) is coupled to a common source line (e.g., SLn), and the local drain pillar (e.g., DP(i)n) is coupled to a common bit line (e.g., BLn). The local source pillar (e.g., SP(i)n+1) is coupled to a common source line (e.g., SLn+1) and the local drain pillar (e.g., DP(i)n+1) is coupled to a common bit line (e.g., BLn+1).

Likewise, the block BLOCK(i+1) includes a memory array A(i+1), which is similar to the memory array A(i) in the block BLOCK(i). A row (e.g., an (m+1)th row) of the memory array A(i+1) is a set of memory cells 20 having a common word line (e.g., WL(i+1) m+1). The memory cells 20 of the memory array A(i+1) in each row (e.g., the (m+1)th row) correspond to a common word line (e.g., WL(i+1) m+1) and are coupled to different source pillars (e.g., SP(i+1) n and SP(i+1) n+1) and drain pillars (e.g., DP(i+1) n and DP(i+1) n+1). A column (e.g., an nth column) of the memory array A(i+1) is a set of memory cells 20 having a local source pillar (e.g., SP(i+1) n) and a local drain pillar (e.g., DP(i+1) n). The memory cells 20 are integrated and connected in parallel. The memory cells 20 of the memory array A(i+1) in each column (e.g., the nth column) correspond to different word lines (e.g., WL(i+1) m+1 and WL(i+1) m) and are coupled to a local source pillar (e.g., SP(i+1) n) and a local drain pillar (e.g., DP(i+1) n). Hence, the memory cells 20 of the memory array A(i+1) are logically arranged in a column along the local source pillar (e.g., SP(i+1) n) and the local drain pillar (e.g., DP(i+1) n).

The block BLOCK(i+1) and the block BLOCK(i) share source lines (e.g., SLn and SLn+1) and bit lines (e.g., BLn and BLn+1). Therefore, the source line SLn and the bit line BLn are coupled to local source pillars and local drain pillars of the nth column of memory cells 20 in the memory array A(i) of the block BLOCK(i), and are coupled to local source pillars and local drain pillars of the nth column of memory cells 20 in the memory array A(i+1) of the block BLOCK (i+1). Similarly, the source line SLn+1 and the bit line BLn+1 are coupled to local source pillars and local drain pillars of the (n+1)th column of memory cells 20 in the memory array A(i) of the block BLOCK(i), and are coupled to local source pillars and local drain pillars of the (n+1)th column of memory cells 20 in the memory array A(i+1) of the block BLOCK(i+1).

Referring to FIG. 2B to FIG. 2D, the memory array may be disposed over an interconnect structure of a semiconductor die, for example, being disposed on one or more active devices (e.g., transistors) of peripheral circuitry formed on a semiconductor substrate. Therefore, the dielectric substrate 50 is, for example, a dielectric layer (e.g., a silicon oxide layer) over a conductive interconnect structure formed on a silicon substrate. In other embodiments, the memory array may be disposed in a multiple chip package, such as a package having a first die including the memory array and a second die including one or more active devices of periphery circuitry connected by die-to-die, or wafer-to-wafer bonding, or by other packaging technologies.

The memory array may include a gate stack structure GSK, a plurality of channel pillars 16, a plurality of first conductive pillars (also referred to as source pillars) 32a, a plurality of second conductive pillars (also referred to as drain pillars) 32b, and a plurality of charge storage structures 40. Each of the channel pillars 16 encloses a corresponding source pillar 32a and drain pillar 32b, for an AND-type NOR architecture device, and in combination form a memory cell pillar 24 in which a column of memory cells is established. Although not described in detail, in an alternative system arranged for a NAND architecture device, the memory cells in a column are arranged in series along a channel pillar to form a NAND string.

FIG. 2B illustrates a pair of channel pillars 16 extending through gate layers 38 with overlying source line and bit line structures. Thus, in this example, the gate stack structure GSK is formed on the dielectric substrate 50 in the memory array region. The gate stack structure GSK includes a plurality of gate layers (also referred to as word lines) 38 and a plurality of insulating layers 54 vertically stacked on a surface 50s of the dielectric substrate 50. In a direction Z, the gate layers 38 are electrically isolated from each other by the insulating layers 54 disposed therebetween. The gate layers 38 are arranged in planes parallel to an X-Y plane corresponding to the surface 50s of the dielectric substrate 50. The gate layers 38 may have a staircase structure (not shown). In an example staircase structure, a lower gate layer 38 is longer than an upper gate layer 38, and the end of the lower gate layer 38 extends laterally beyond the end of the upper gate layer 38. A contact (not shown) for connecting the gate layer 38 may land on the end of the gate layer 38 to connect the gate layers 38 respectively to conductive lines.

FIG. 2C and FIG. 2D are cross-sections of alternative embodiments of the vertical pillars in which the charge storage structures 40 are disposed between the channel pillars 16 and the gate layers 38. Each of the charge storage structures 40 may include a tunneling layer (which can be a bandgap engineered tunneling oxide layer) 14, a charge storage layer 12, and a blocking layer 36. The charge storage layer 12 is located between the tunneling layer 14 and the blocking layer 36. In some embodiments, the tunneling layer 14 and the blocking layer 36 include silicon oxide. The charge storage layer 12 includes silicon nitride or other materials capable of trapping charges. In some embodiments, as shown in FIG. 2C, a portion (the tunneling layer 14 and the charge storage layer 12) of the charge storage structure 40 continuously extends in a direction (i.e., the direction Z) perpendicular to the gate layer 38, and the other portion (the blocking layer 36) of the charge storage structure 40 surrounds the gate layer 38. In other embodiments, as shown in FIG. 2D, the charge storage layer 12 and the blocking layer 36 of the charge storage structure 40 surround the gate layer 38.

Referring to FIG. 2B to FIG. 2D, the memory array further includes a plurality of channel pillars 16 extending through the gate layers in the direction Z orthogonal to the X-Y plane. In some embodiments, each of the channel pillars 16 has an annular shape from a top view, surrounding respective pairs of conductive pillars, each pair of conductive pillars including a drain pillar (conductive pillar 32b) and a source pillar (conductive pillar 32a). A material of the channel pillars includes a semiconductor material, such as undoped polysilicon.

Referring to FIG. 2B to FIG. 2D, in this example an insulating pillar 28 is disposed between the conductive pillars 32a and 32b inside a corresponding channel pillar 16. In this example, as mentioned above, the first conductive pillars 32a serve as source pillars. The second conductive pillars 32b serve as drain pillars. The first conductive pillar 32a, the second conductive pillar 32b and the insulating pillar 28 each extend in a direction (i.e., the direction Z) perpendicular to the surface of the gate layer 38. The first conductive pillar 32a and the second conductive pillar 32b are separated from each other by insulation such as the insulating pillar 28. The first conductive pillar 32a and the second conductive pillar 32b can be implemented using doped polysilicon or metal materials. The insulating pillar 28 may be, for example, silicon nitride.

Referring to FIG. 2E, the charge storage structure 40, the channel pillar 16, the source pillar 32a, and the drain pillar 32b are surrounded by the gate layer 38, and a memory cell 20 is defined. According to different operation methods, a 1-bit operation or a 2-bit operation may be performed on the memory cell 20. For example, when a voltage is applied to the source pillar 32a and the drain pillar 32b, since the source pillar 32a and the drain pillar 32b are connected to the channel pillar 16, electrons may be transferred along the channel pillar 16 and stored in the charge storage structure 40. Accordingly, a 1-bit operation may be performed on the memory cell 20. In addition, for an operation involving Fowler-Nordheim tunneling, electrons or holes may be trapped in the charge storage structure 40 between the source pillar 32a and the drain pillar 32b, to set threshold levels for single or multiple-bit-per-cell operations. For an operation involving source-side injection, channel hot electron injection, or band-to-band tunneling hot carrier injection, electrons or holes may be locally trapped in the charge storage structure 40 adjacent to one of the source pillar 32a and the drain pillar 32b. Accordingly, a single level cell (SLC, 1 bit) or multi-level cell (MLC, greater than or equal to 2 bits) operation may be performed on the memory cell 20.

Referring to FIG. 2A and FIG. 2B, during operation, a voltage is applied to a selected word line (gate layer) 38; for example, when a voltage higher than a corresponding threshold voltage (Vth) of the corresponding memory cell 20 is applied, the channel pillar 16 intersecting the selected word line 38 is turned on to allow a current to enter the drain pillar 32b from the bit line BLn or BLn+1 (shown in FIG. 2B), flow to the source pillar 32a via the turned-on channel region (e.g., in a direction indicated by arrow 60), and finally flow to the source line SLn or SLn+1 (shown in FIG. 2B).

Figure 2F:
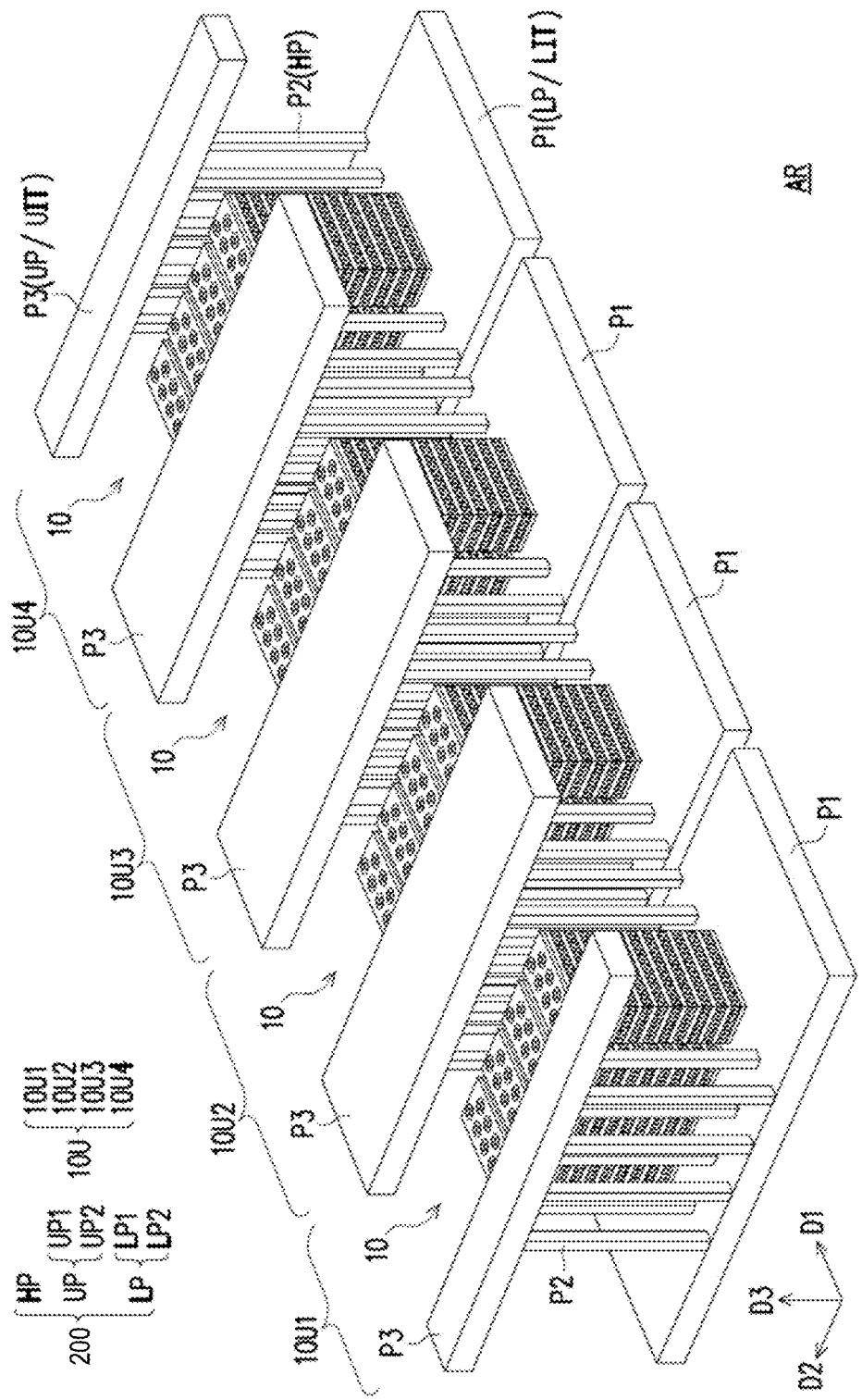
Figure 2G:
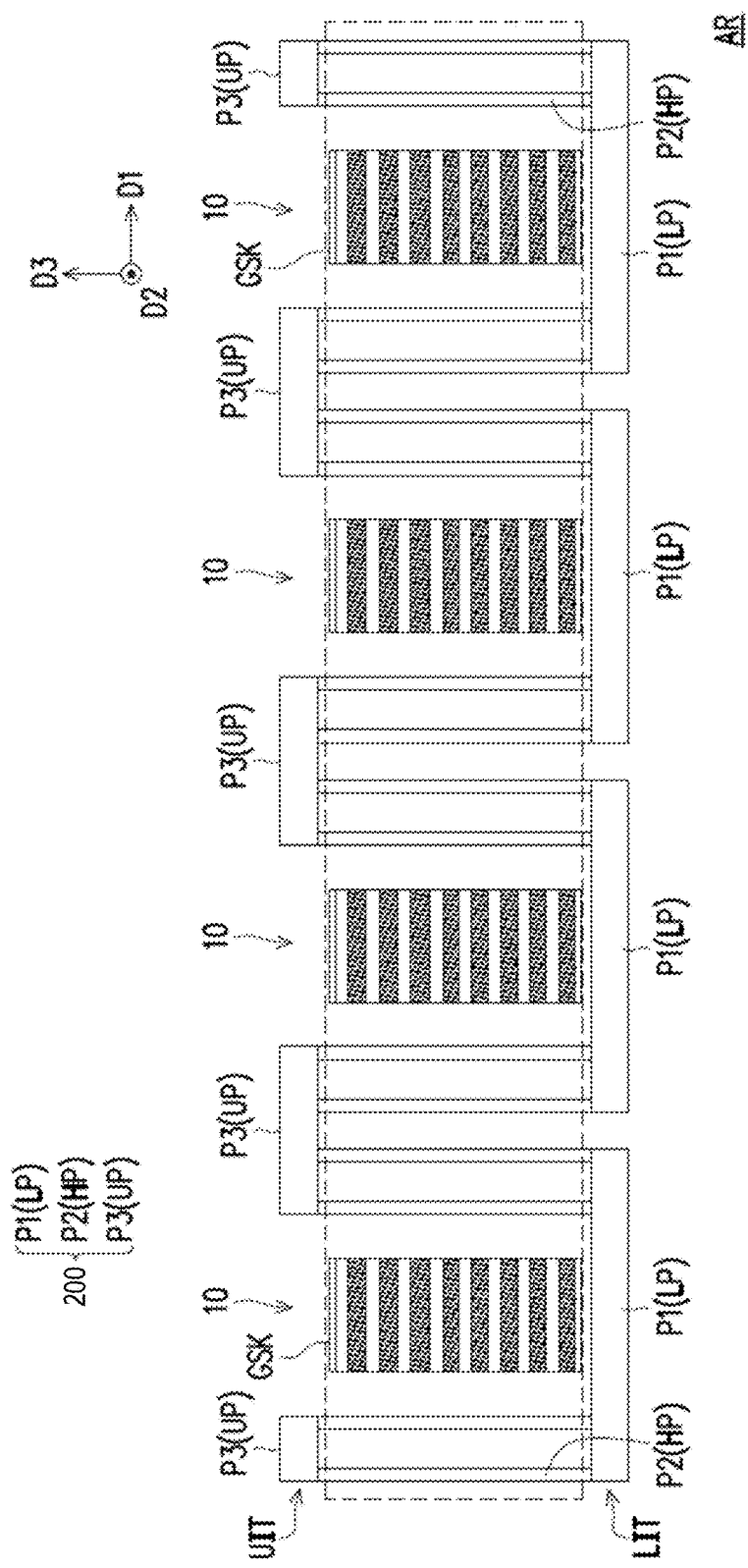
Figure 2H:
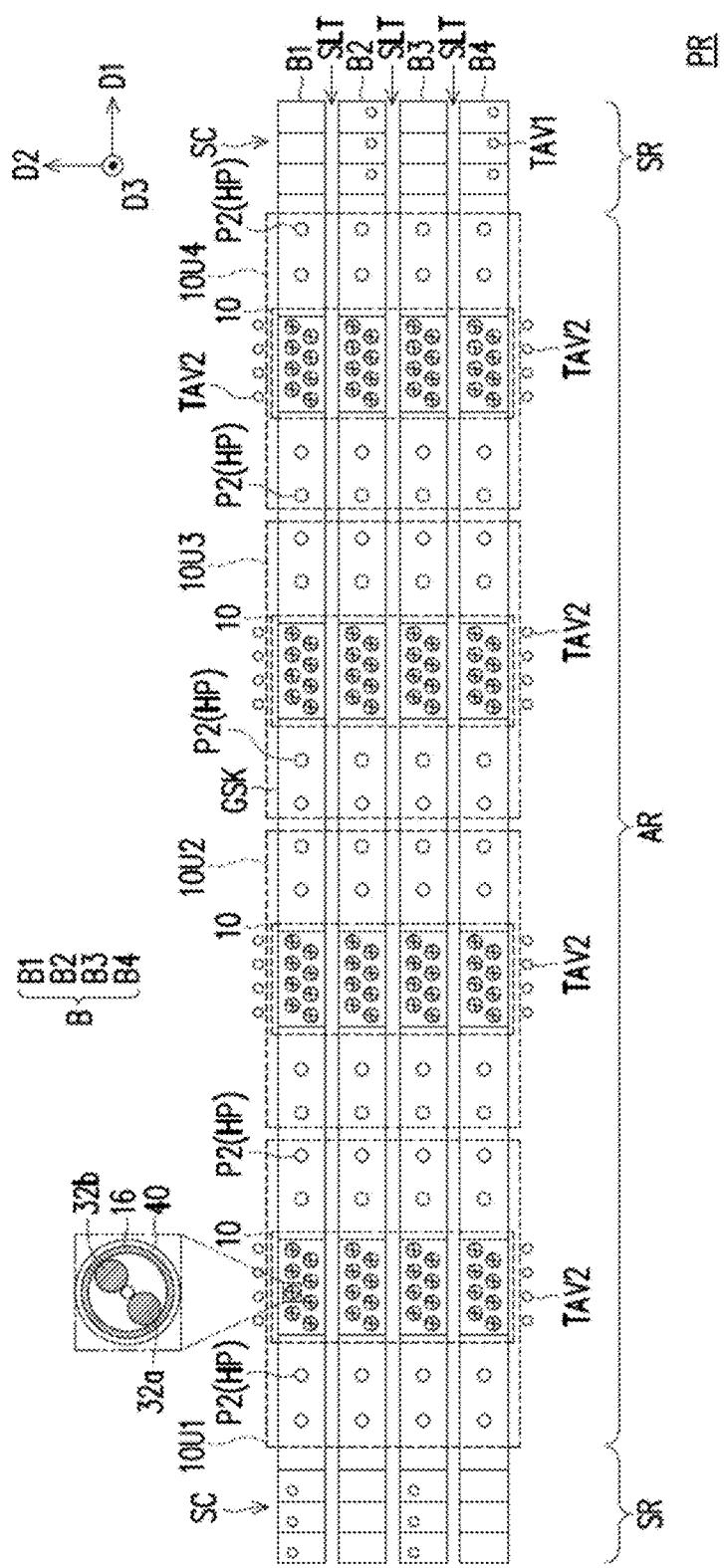
Figure 21:
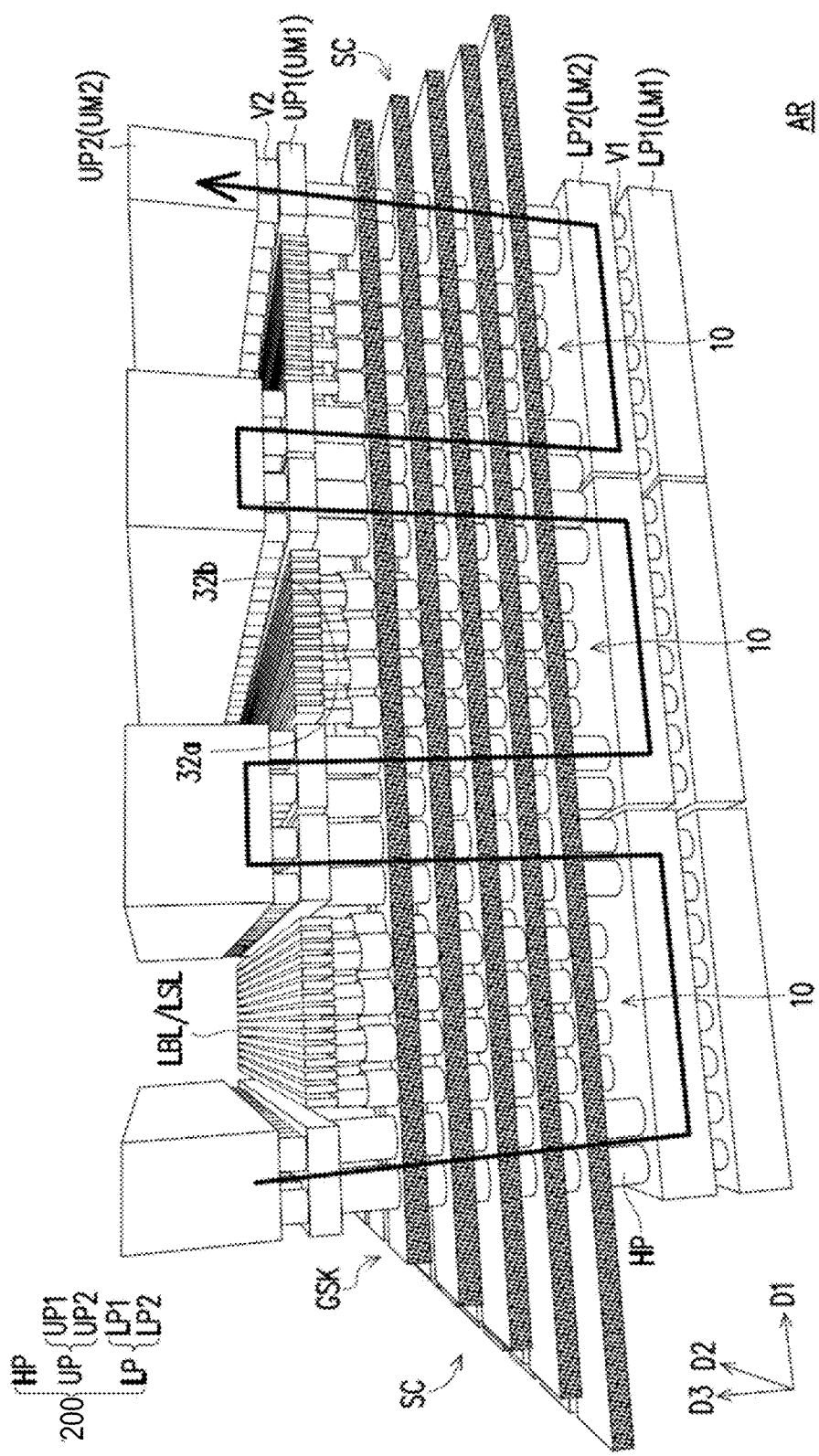
Figure 2J:
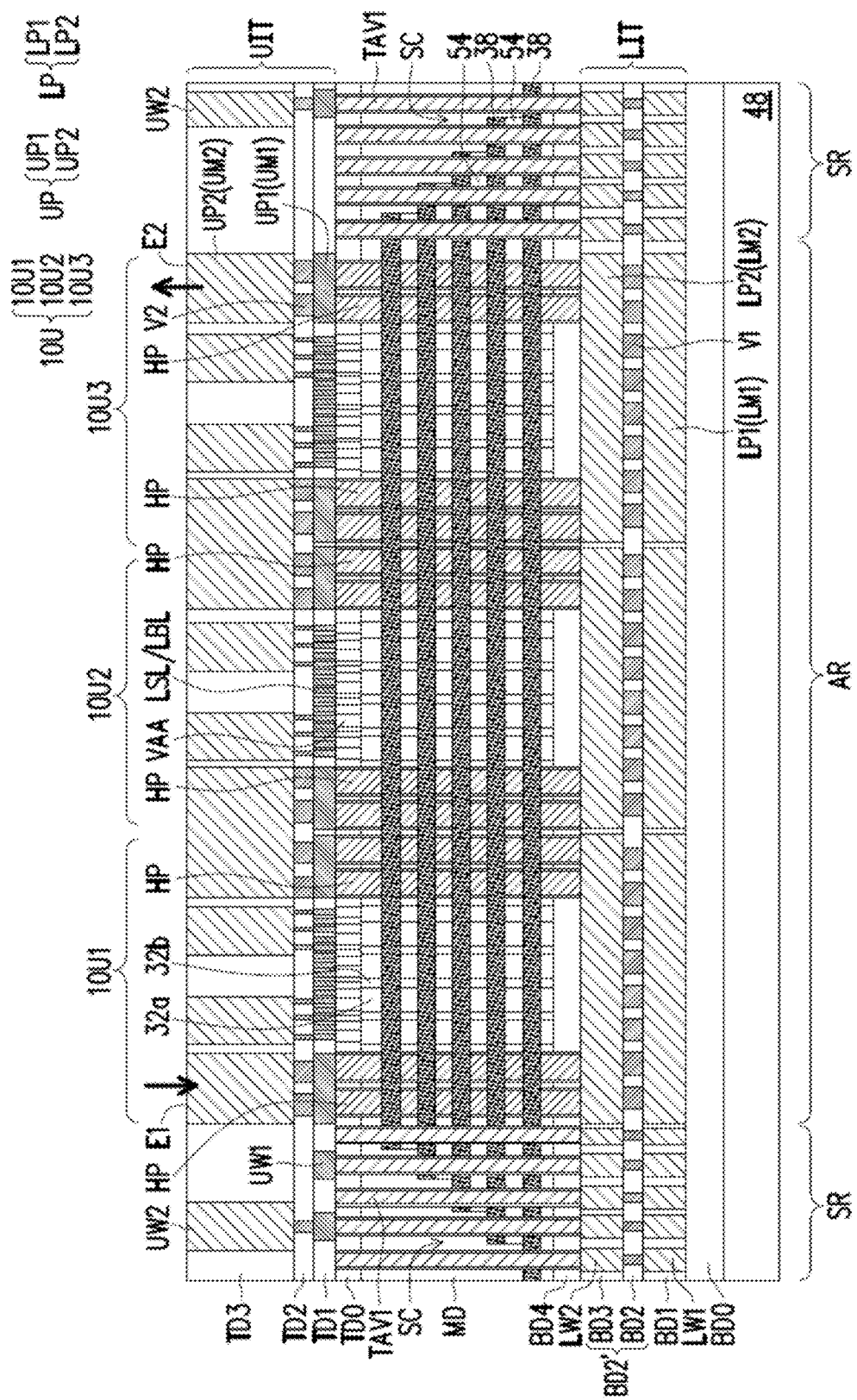
Figure 2K:
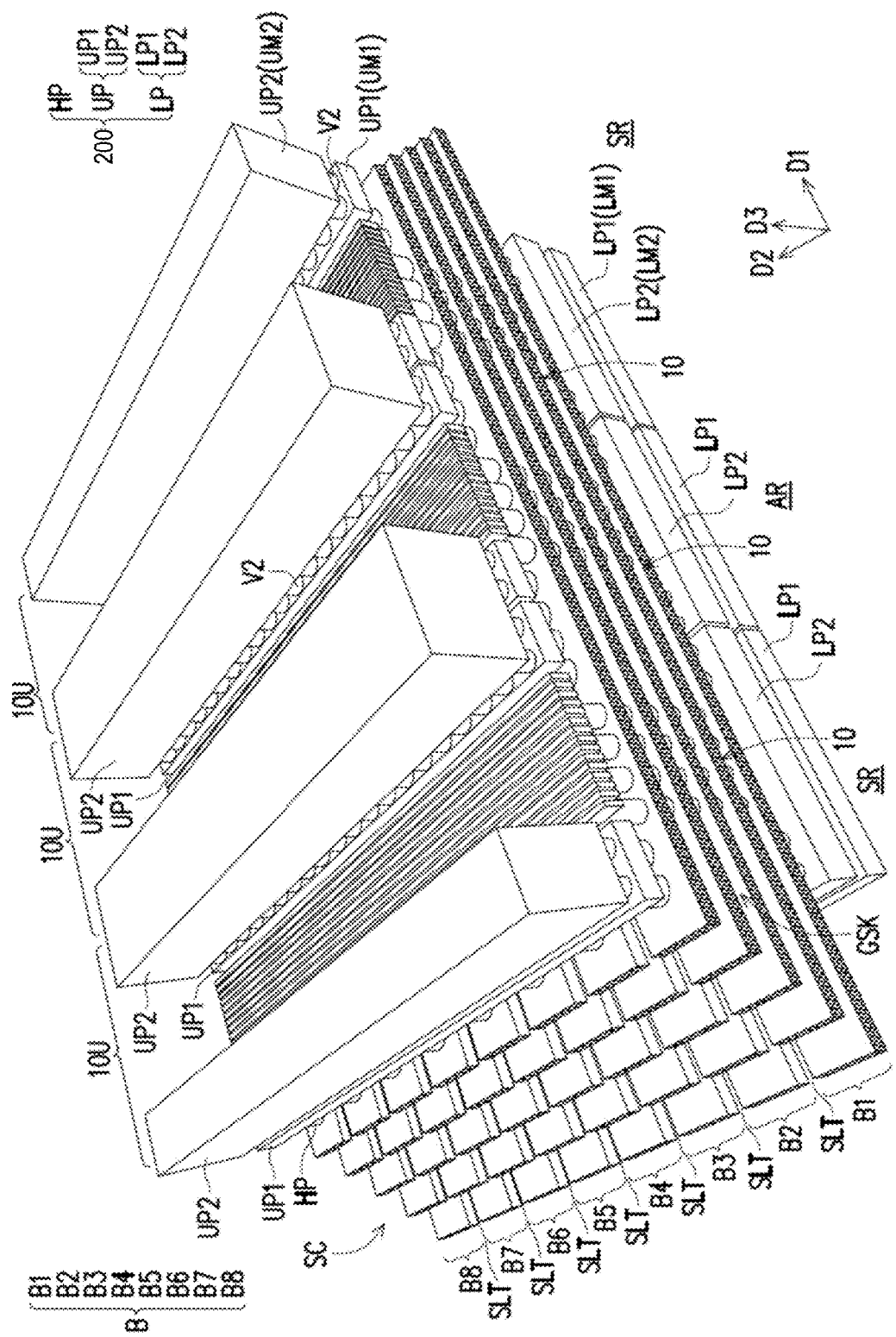

FIG. 2F, FIG. 2I and FIG. 2K are 3D perspective views, and FIG. 2G, FIG. 2H, and FIG. 2J are cross-sectional views illustrating a 3D AND-type NOR flash memory having a resistive component providing a heater 200 according to some embodiments of the present invention. For clarity, some elements are omitted in FIG. 2F to FIG. 2K.

Referring to FIG. 2F, the 3D AND-type NOR flash memory according to some embodiments of the present invention further includes a heater 200 comprising a set of bottom conductor plates P1, a set of conductors in through array vias P2, and a set of top conductor plates P3. The heater 200 can be referred to as a micro-heater, which is located in the high endurance region of the memory array region AR. The heater 200 is disposed in thermal communication with a plurality of memory array subunits 10. In FIG. 2F, the gate layers are represented only in the regions of the memory cell columns in order to more surely disclose the TAV structure of the heater. As illustrated in FIG. 2I and FIG. 2K, the gate layers extend along the entire sector of the heated array units terminated in staircase structures.

FIG. 2H is a layout view of an example heater block B which includes a heated array unit of memory cells, with multiple array subunits, and a single heater unit. The heater block B in this example comprises a set of four array sectors B1, B2, B3, B4. A sector in this context is defined as a set of memory cell columns which share a single stack of gate layers, separated from the gate layers in adjacent sectors of the heater block B. In this example, the array sectors B1, B2, B3, B4 each include two offset rows of memory cell columns, arranged in four subunits each configured for connection to eight overlying bit lines and eight overlying source lines each of which can connect selected memory cell columns to 32 overlying bit lines and source lines in parallel. In this example, each of the four array sectors B1, B2, B3, B4 includes a staircase structure SC on each end. The number of array sectors implemented in a single heater block B is selected according to the thermal characteristics of the structure, the density required for a given implementation, and other factors. Thus, some embodiments may comprise two array sectors in each heater block B. Others may comprise eight, 16 or more. Also the number of subunits implemented in a single heater block B is selected according to the thermal characteristics of the structure, the density required for a given implementation, and other factors. In this example there are four subunits illustrated. In other examples, there may be one, two, eight, 16 or more subunits in a given heater block B.

In FIG. 2H, through array vias TAV1 having conductors which connect staircase landing contacts to a decoder of other periphery circuits under the array.

In FIG. 2H, the heated array unit includes an additional set of through array vias TAV2 with conductors therethrough, which are disposed on the sides of the heated array unit adjacent the memory cell columns. The through array vias TAV2 can connect source lines and bit lines to periphery circuitry under the array.

FIG. 2I illustrates a current path for a heater 200 of a heated array unit having three subunits, the current path passes through the gate stack structure GSK in conductors of the through array vias, and through the top conductor plates above the gate stack structure GSK and bottom conductor plates below the gate stack structure GSK. The heater 200 may heat a block B having a single sector of memory cells, or a block B having a plurality of sectors, such as 4 sectors, 8 sectors (as shown in FIG. 2K), 16 sectors or 32 sectors, but the present invention is not limited thereto.

Referring to FIG. 2F and FIG. 2G, the heater 200 is, for example, in a snake-like shape. More specifically, the heater 200 includes a plurality of first portions P1, a plurality of second portions P2, and a plurality of third portions P3 connected to each other. The second portion P2 is located between the first portion P1 and the third portion P3. The first portion P1 and the third portion P3 are partially overlapped, and the overlapping portions are connected by the plurality of second portions P2. The first portion P1 includes a lower hot plate LP. The second portion P2 includes a conductive pillar (or referred to as a heating pillar) HP. The third portion P3 includes an upper hot plate UP.

Referring to FIG. 2F and FIG. 2G, a plurality of conductive pillars HP are arranged around the memory array subunits 10. The plurality of memory array subunits 10 are sandwiched between the plurality of conductive pillars HP. In some embodiments, the plurality of conductive pillars HP and the plurality of memory array subunits 10 are alternately arranged in a first direction D1.

Referring to FIG. 2H and FIG. 2K, the plurality of conductive pillars HP are separated by a plurality of slit structures SLT and laterally adjacent to the plurality of slit structures SLT. The slit structures SLT extend in the first direction D1, and divide the gate stack structure GSK into a plurality of sectors (for example, B1, B2, B3, and B4). The plurality of conductive pillars HP of the heater 200 are located in the plurality of sectors (for example, B1, B2, B3, B4) and extend through the gate stack structure GSK. In some embodiments, the plurality of conductive pillars HP, which are electrically isolated from the gate layers of the gate stack structure, and the plurality of slit structures SLT are alternately arranged in the second direction D2. The second direction D2 is different from the first direction D1. The second direction D2 and the first direction D1 are, for example, perpendicular to each other. The first direction D1 is, for example, the X direction, and the second direction D2 is, for example, the Y direction.

Referring to FIG. 2F and FIG. 2H, in some embodiments, each memory array subunits 10, two rows of conductive pillars HP on both sides thereof, and a lower interconnect structure LIT and an upper interconnect structure UIT thereover and therebelow may be also referred to as a module unit 10U. Therefore, in FIG. 2H, there are four module units 10U1, 10U2, 10U3 and 10U4 between the staircase structures SC. However, the present invention is not limited thereto. In each module unit 10U, more or less rows of conductive pillars HP may be disposed on both sides of each memory array subunit 10. In addition, the number of the plurality of conductive pillars HP on both sides of each module unit 10U may be the same or different.

Referring to FIG. 2I and FIG. 2J, the plurality of conductive pillars HP are arranged in the memory array region AR between the staircase structures SC. The conductive pillars HP are laterally adjacent to the plurality of source pillars 32a and the plurality of drain pillars 32b. The plurality of conductive pillars HP sandwich the plurality of source pillars 32a and the plurality of drain pillars 32b therebetween.

Referring to FIG. 2H and FIG. 2J, the plurality of conductive pillars HP may be formed simultaneously with other processes. For example, in some embodiments, the 3D AND-type NOR flash memory further includes a plurality of array vias TAV1 and TAV2. The plurality of array vias TAV1 are disposed in the heater units for heater pillars, and in the staircase region SR and pass through the staircase structure SC of the gate stack structure GSK. The plurality of array vias TAV2 are disposed in the peripheral region PR, and pass through insulating materials or dielectric materials in the peripheral region PR. The plurality of conductive pillars HP may be or may be not formed simultaneously with the plurality of array vias TAV1 and TAV2.

Referring to FIG. 2G, the lower hot plate LP of the heater 200 is disposed below the conductive pillar HP and the gate stack structure GSK. The lower hot plate LP may be a portion of the lower interconnect structure LIT disposed below the gate stack structure GSK. The upper hot plate UP of the heater 200 is disposed above the conductive pillar HP and the gate stack structure GSK. The upper hot plate UP may be a portion of the upper interconnect structure UIT disposed above the gate stack structure GSK.

Referring to FIG. 2F and FIG. 2G, in some embodiments, the lower hot plate LP may be a portion of a single conductive layer of the lower interconnect structure LIT. The upper hot plate UP may be a portion of a single conductive layer of the upper interconnect structure UIT. In alternative embodiments, the lower hot plate LP includes a portion of two or more conductive layers of the lower interconnect structure LIT and a plurality of vias (not shown) located between the conductive layers. The upper hot plate UP includes a portion of two or more conductive layers of the upper interconnect structure UIT and a plurality of vias (not shown) located between these conductive layers.

Referring to FIG. 2I and FIG. 2J, particularly, the lower hot plate LP includes a portion of the first lower conductive layer LM1, a portion of the second lower conductive layer LM2 and a plurality of first vias V1 of the lower interconnect structure LIT. The upper hot plate UP includes a portion of the first upper conductive layer UM1, a portion of the second upper conductive layer UM2 and a plurality of second vias V2 of the lower interconnect structure LIT.

Referring to FIG. 2J, the first lower conductive layer LM1 is located between the substrate 48 and the gate stack structure GSK. The second lower conductive layer LM2 is located between the first lower conductive layer LM1 and the gate stack structure GSK. There may be no conductive layer between the first lower conductive layer LM1 and the substrate 48. However, the present invention is not limited thereto. Other conductive layers (not shown) may also be disposed between the first lower conductive layer LM1 and the substrate 48.

FIG. 3A illustrates a lower conductive layer LM1 having three lower conductive plates LP1 for three heated array units in a heater block. Each of the three lower conductive plates LP1 extends across the eight sectors B1 to B8 of the heater block illustrated, below corresponding to a heated array subunits 10 (See, FIG. 3D).

Referring to FIG. 2K and FIG. 3A, the first lower conductive layer LM1 includes a plurality of first lower conductive plates LP1 separated from each other. Each first lower conductive plate LP1 extends in the first direction D1 and the second direction D2. In some embodiments, each first lower conductive plate LP1 is disposed across the plurality of sectors (for example, B1-B8 in FIG. 2K), so that a memory array subunit 10, a portion of the plurality of conductive pillars HP and a portion of the plurality of slit structures SLT in the plurality of sectors B1 to B8 are directly disposed on the first lower conductive plate LP1, as shown in FIG. 3D. In other embodiments, each first lower conductive plate LP1 is disposed across a single sector. In still other embodiments, each first lower conductive plate LP1 is disposed across other numbers of sectors B, such as 2 or 16 sectors.

Figure 3C:
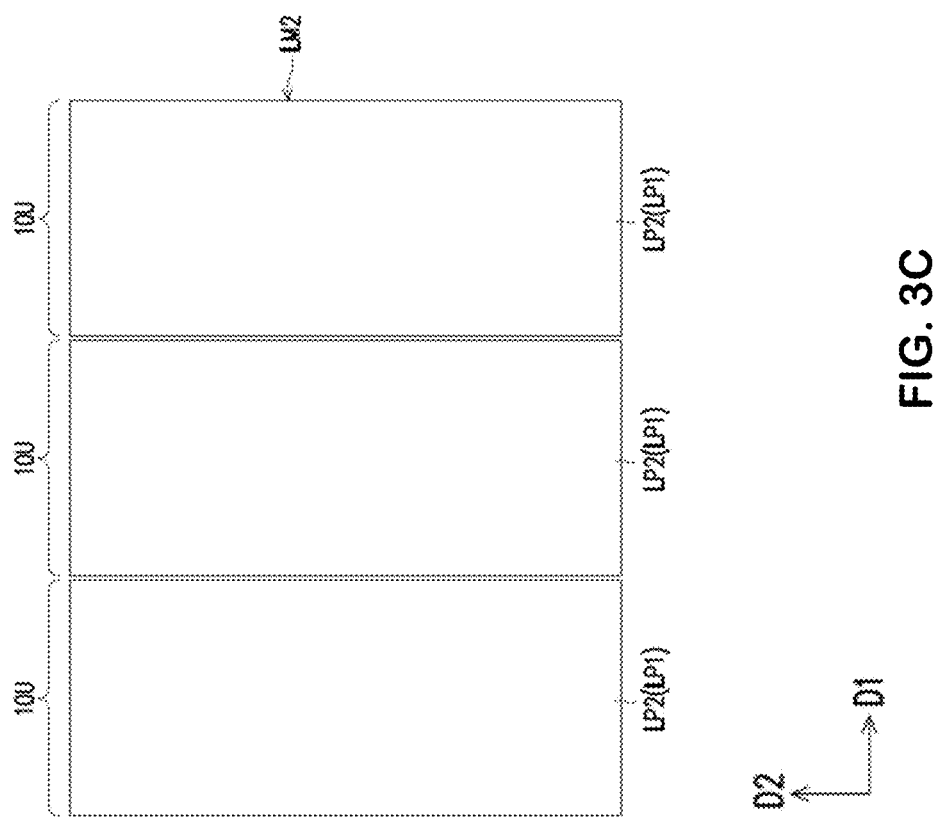
Figure 3D:
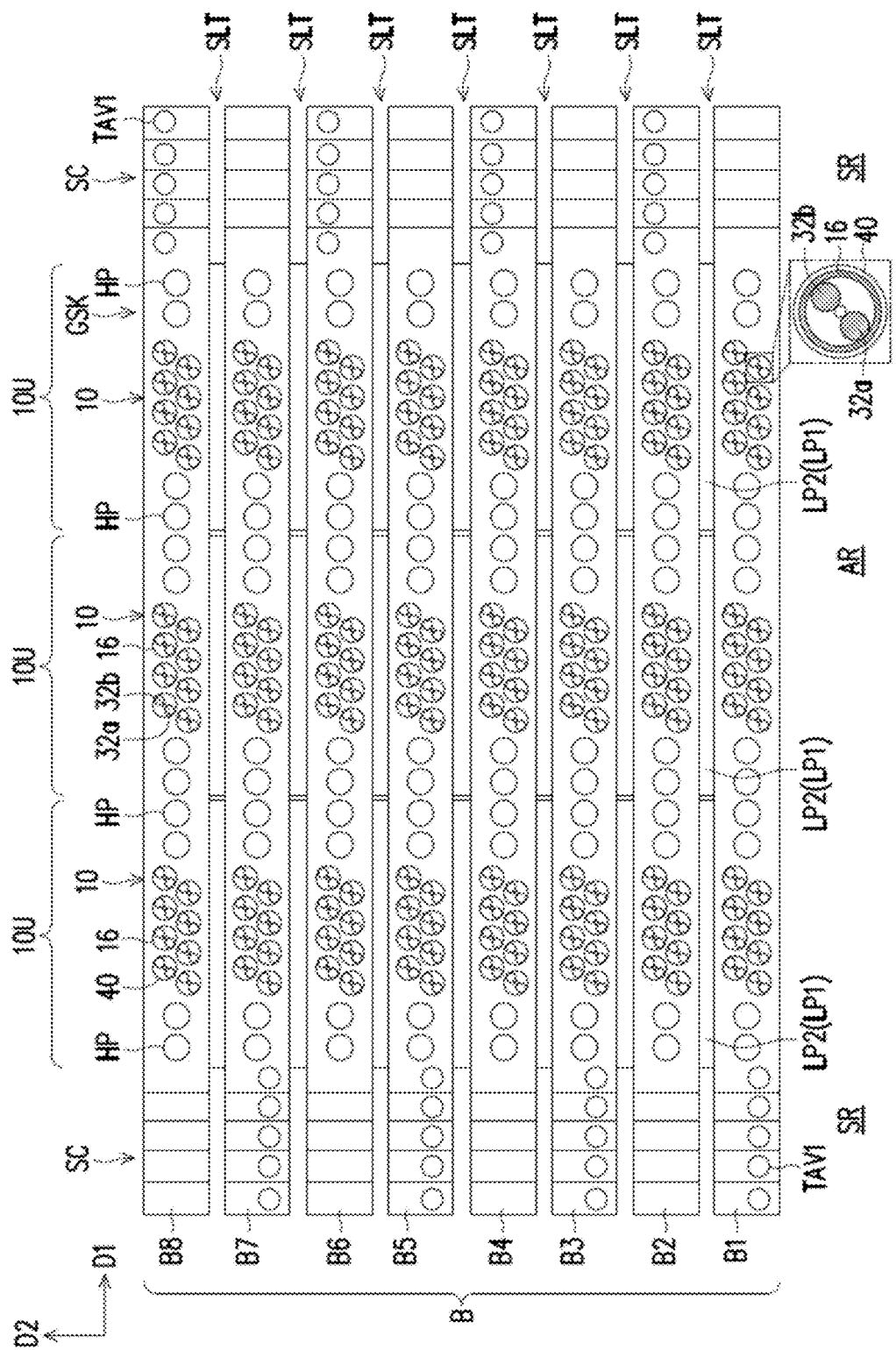

Referring to FIG. 2K and FIG. 3C, for a lower conductive plate having two layers, a second lower conductive layer LM2 includes a plurality of second lower conductive plates LP2 separated from each other. Each second lower conductive plate LP2 extends in the first direction D1 and the second direction D2. In some embodiments, each second lower conductive plate LP2 is disposed across the plurality of sectors (for example, B1-B8) to cover the first lower conductive plate LP1, so that a memory array subunit 10, a portion of the plurality of conductive pillars HP and a portion of the plurality of slit structures SLT in the plurality of sectors B1 to B8 are directly disposed on the second lower conductive plate LP2, as shown in FIG. 3D. In other embodiments, each second lower conductive plate LP2 is disposed across a single sector. In still other embodiments, each second lower conductive plate LP2 is disposed across other numbers of sectors B, such as 2 or 16 blocks.

Referring to FIG. 2I and FIG. 2J, the plurality of first vias V1 are located between, and include conductors connected to, the plurality of first lower conductive plates LP1 and the plurality of second lower conductive plate LP2. In other words, the plurality of first lower conductive plates LP1 and the plurality of second lower conductive plate LP2 are connected in parallel by conductor in the plurality of first vias V1. The plurality of first lower conductive plates LP1, the plurality of second lower conductive plate LP2, and the conductors in the plurality of first vias V1 form the lower hot plate LP of the heater 200.

Referring to FIG. 2J, a lower dielectric layer BD4 is located between the gate stack structure GSK and the second lower conductive layer LM2. An upper dielectric layer TD0 is located between the gate stack structure GSK and the first upper conductive layer UM1. The source pillars 32a and the drain pillars 32b are located between the lower dielectric layer BD4 and the upper dielectric layer TD0. The plurality of conductive pillars HP further extend through the lower dielectric layer BD4 and the upper dielectric layer TD0. The length of the conductive pillar HP in the TAV of the heater is greater than the length of the source pillar 32a and the length of the drain pillar 32b. Therefore, the conductive pillars HP laterally adjacent to the plurality of source pillars 32a and the plurality of drain pillars 32b may heat the plurality of memory cells 20 formed at the intersections of the plurality of source pillars 32a, the plurality of drain pillars 32b and the gate layers 38 completely.

Referring to FIG. 2I to FIG. 2K, the upper interconnect structure UIT includes upper dielectric layers TD1, TD2, and TD3, and a first upper conductive layer UM1, a second upper conductive layer UM2 and a plurality of second vias V2 therein respectively. The first upper conductive layer UM1 is located above the gate stack structure GSK. The second upper conductive layer UM2 is located above the first upper conductive layer UM1. The plurality of second vias V2 are located between and electrically connected to the first upper conductive layer UM1 and the second upper conductive layer UM2.

Figure 3E:
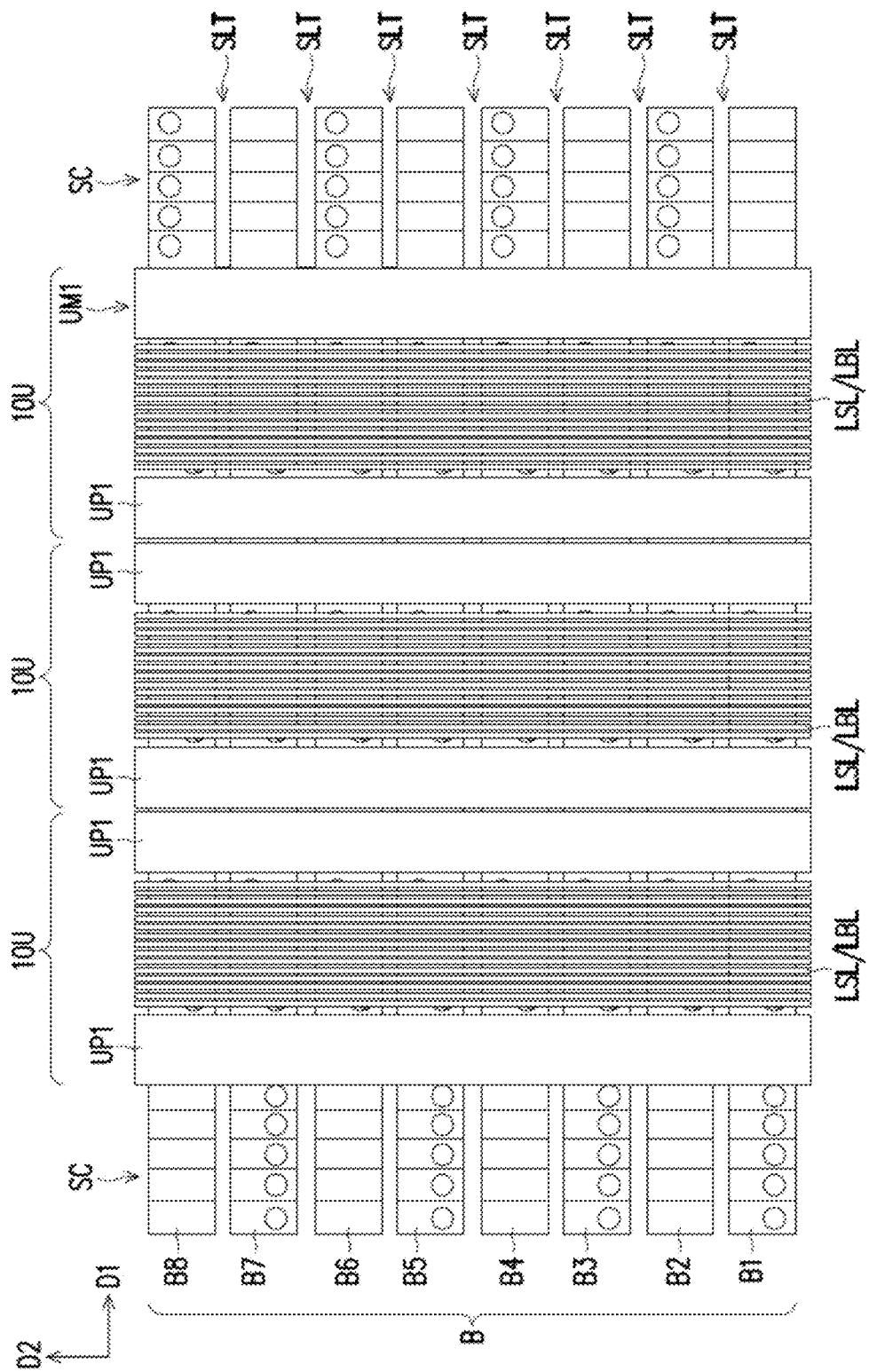

Referring to FIG. 2J and FIG. 2K, the first upper conductive layer UM1 includes a plurality of first upper conductive plates UP1 separated from each other, and the plurality of first upper conductive plates UP1 are electrically connected to the plurality of conductive pillars HP therebelow. Referring to FIG. 2K and FIG. 3E, each first upper conductive plate UP1 extends in the first direction D1 and the second direction D2. In some embodiments, each first upper conductive plate UP1 is disposed across the plurality of sectors B1 to B8 to cover a portion of the plurality of memory arrays 10, a portion of the plurality of conductive pillars HP, and a portion of the plurality of slit structures SLT in the plurality of heater blocks B shown in FIG. 2K and FIG. 3D. In other embodiments, each first upper conductive plate UP1 is disposed across a single sector. In still other embodiments, each first upper conductive plate UP2 is disposed across other numbers of sectors B, such as 2 or 16 sectors.

Referring to FIG. 2I, in some embodiments, each second lower conductive plate LP2 is covered by two first upper conductive plates UP1 separated from each other. The area of the first upper conductive plate UP1 is smaller than that of the corresponding second lower conductive plate LP2.

Referring to FIG. 2I and FIG. 3E, the first upper conductive layer UM1 further includes a plurality of local source lines LSL and a plurality of local bit lines LBL extending in the second direction D2. The plurality of local source lines LSL are connected to the plurality of source pillars 32a shown in FIG. 2I or FIG. 3D. The plurality of local bit lines LBL are connected to the plurality of drain pillars 32b shown in FIG. 2I or FIG. 3D. The plurality of local source lines LSL and the plurality of local bit lines LBL are located between the plurality of first upper conductive plates UP1. As shown in FIG. 2J and FIG. 3E, in some embodiments, each memory array subunit 10, the two rows of conductive pillars HP on both sides thereof, the lower interconnect structure LIT thereabove and the upper interconnect structure UIT therebelow may be also referred to as a module unit 10U. The present invention is not limited thereto. In each module unit 10U, more or less rows of conductive pillars HP may be disposed on both sides of each memory array subunit 10. The two rows of conductive pillars HP on both sides of each module unit 10U are connected to two first upper conductive plates UP1. The two rows of conductive pillars HP on both sides of each module unit 10U are connected to one second lower conductive plate LP2.

In FIG. 2H, in some embodiments, four sectors, each having four heated array module units 10U1, 10U2, 10U3, 10U4 are disposed between two staircase structures SC. However, the embodiments of the present invention are not limited thereto. In other embodiments, fewer (for example, 2) heated array module units 10U may be disposed in each sector between two staircase structures SC. In other embodiments, more (for example, 4, 8, 16 or 32) heated array module units 10U may be disposed between two staircase structures SC in each sector.

Figure 3F:
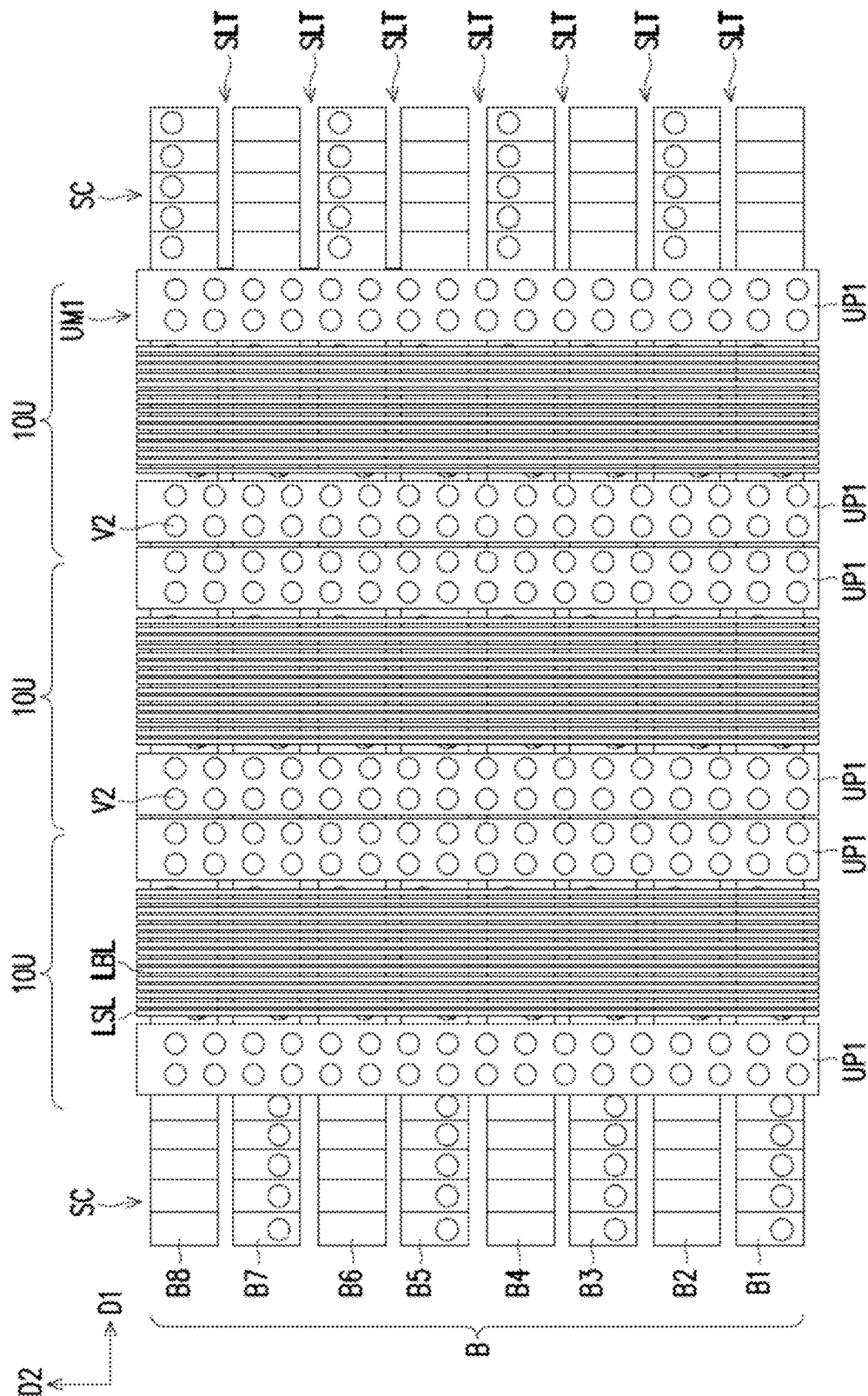
Figure 3G:
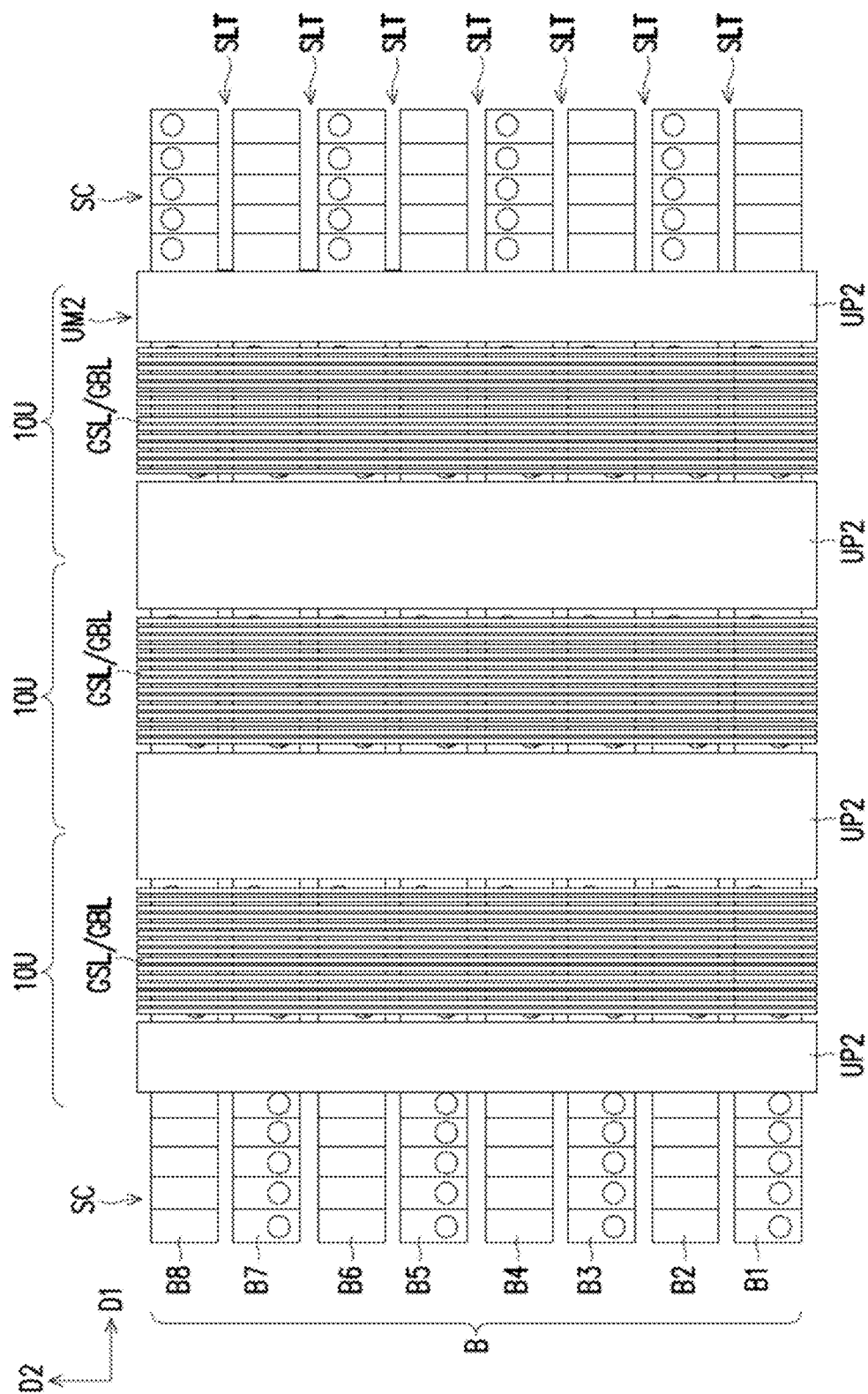

Referring to FIG. 2K and FIG. 3G, the second upper conductive layer UM2 is located above the first upper conductive layer UM1. The second upper conductive layer UM2 includes a plurality of second upper conductive plates UP2 separated from each other. Each second upper conductive plate UP2 extends in the first direction D1 and the second direction D2. In some embodiments, each second upper conductive plate UP2 is disposed across a plurality of heater segments (for example, B1 to B8) in the second direction D2, to cover the first upper conductive plate UP1. In some embodiments, each second upper conductive plate UP2 is disposed across a single heated array unit in the eight sectors B1-B8 of the heated block to cover the first upper conductive plate UP1. In yet other embodiments, each second upper conductive plate UP2 is disposed across other numbers of sectors, for example, 16 sectors, to cover the plurality of first upper conductive plates UP1. Furthermore, in some embodiments, each second upper conductive plate UP2 in the central region covers two adjacent first upper conductive plates UP1 of two adjacent module units 10U, and each second upper conductive plate UP2 in the edge region covers a single first upper conductive plate UP1.

Referring to FIG. 2I, FIG. 2J, FIG. 2K and FIG. 3F, a plurality of second vias V2 are located between and connected to the plurality of first upper conductive plates UP1 and the plurality of second upper conductive plates UP2. In other words, the plurality of first upper conductive plates UP1 and the plurality of second upper conductive plates UP2 are connected in parallel with each other through the plurality of second vias V2. The plurality of first upper conductive plates UP1, the plurality of second upper conductive plates UP2 and the plurality of second via V2 form the upper hot plate UP of the heater 200. In other words, each upper hot plate UP is shared by two adjacent module units 10U.

Referring to FIG. 2J and FIG. 3G, the second upper conductive layer UM2 further includes a plurality of global source lines GSL and a plurality of global bit lines GBL extending in the second direction D2. The plurality of global source lines GSL are connected to the local source lines LSL through the second vias V2. The plurality of global bit lines GBL are connected to the local bit lines LBL through the second vias V2. The plurality of global source lines GSL and the plurality of global bit lines GBL are located between the plurality of second upper conductive plates UP2.

Referring to FIG. 2K, FIG. 3C and FIG. 3F, the area of the first upper conductive plate UP1 is smaller than that of the corresponding second lower conductive plate LP2.

Referring to FIG. 3B, the plurality of first vias V1 connecting the first lower conductive plate LP1 may be arranged in a first array. Referring to FIG. 3F, the plurality of second vias V2 connecting the first upper conductive plate UP1 may be arranged in a second array. The number of the first vias V1 in the first array is greater than the number of the second vias V2 in the second array. However, the present invention is not limited thereto. The plurality of first vias V1 may be arranged in a non-array, and the plurality of second vias V2 may also be arranged in a non-array.

Each lower hot plate LP is connected in series with the upper hot plate UP through a plurality of conductive pillars HP. The upper hot plate UP connects a plurality of conductive pillars HP of two adjacent array module units 10U. Thereby, the plurality of lower hot plates LP, the plurality of conductive pillars HP, and the plurality of upper hot plates UP may form the heater 200.

Referring to FIG. 2J, the heater 200 has a snake-like shape, and may surround the plurality of memory arrays 10 in the plurality of module units 10U, to heat these memory arrays 10 nearby. During the repair process, the current may enter from the first end E1 of the heater 200, pass through the heater 200, and then flow out from the second end E2 of the heater 200.

FIG. 3A to FIG. 3G are cross-sectional views of an example manufacturing process of a flash memory device according to an embodiment of the present disclosure.

Referring to FIG. 2J and FIG. 3A, a substrate 48 is provided. The substrate 48 may further include a device layer (not shown) on a semiconductor substrate. The device layer may include active devices or passive devices. The active devices are, for example, transistors, diodes, and the like. The passive devices are, for example, capacitors, inductors, and the like. The transistor may be an N-type metal-oxide-semiconductor (NMOS) transistor, a P-type metal-oxide-semiconductor (PMOS) transistor, or a complementary metal-oxide-semiconductor (CMOS). For example, the device layer may include page buffers.

Referring to FIG. 2J, a lower interconnect structure LIT is formed on the device layer of the substrate 48. First, a lower dielectric layer BD0 is formed on the device layer, and a plurality of conductive plugs (not shown) are formed in the lower dielectric layer BD0. The lower dielectric layer BD0 is, for example, silicon oxide. The plurality of conductive plugs may extend through the dielectric layer BD0 to electrically connect the device layer. The conductive plug includes a conductive layer and a barrier layer surrounding the conductive layer. The conductive layer is, for example, tungsten. The barrier layer is, for example, titanium, titanium nitride, tantalum, tantalum nitride, or a combination thereof.

Referring to FIG. 2J and FIG. 3A, then, a conductive layer is formed on the lower dielectric layer BD0, and the conductive layer is patterned through lithography and etching processes to form a first lower conductive layer LM1. The first lower conductive layer LM1 includes a plurality of first lower conductive plates LP1 separated from each other and a plurality of conductive lines LW1. The material of the conductive layer includes metal, such as copper.

Referring to FIG. 2J, a lower dielectric layer BD1 is formed on the first lower conductive layer LM1. The lower dielectric layer BD1 is, for example, silicon oxide. Afterwards, a chemical mechanical polishing process may be performed to planarize the lower dielectric layer BD1.

Referring to FIG. 2J, next, a lower dielectric layer BD2 is formed on the lower dielectric layer BD1 and the first lower conductive layer LM1. Next, referring to FIG. 2J and FIG. 3B, a plurality of first vias V1 connected to the plurality of first lower conductive plates LP1 are formed in the lower dielectric layer BD2. The plurality of first vias V1 include a conductive material, such as tungsten. The formation of the plurality of first vias V1 includes, for example, forming a plurality of via holes in the lower dielectric layer BD2, and then forming a conductive material on the lower dielectric layer BD2 to fill the plurality of via holes. After that, a chemical mechanical polishing process or an etch-back process is performed to remove excess conductive material on the lower dielectric layer BD2.

Referring to FIG. 2J and FIG. 3C, a conductive layer is formed on the lower dielectric layer BD2 and the plurality of first vias V1, and the conductive layer is patterned through a lithography and etching process to form a second lower conductive layer LM2. The second lower conductive layer LM2 includes a plurality of second lower conductive plates LP2 separated from each other and a plurality of conductive lines LW2. The material of the conductive layer includes metal, such as copper.

Referring to FIG. 2J, after that, a lower dielectric layer BD3 is formed on the second lower conductive layer LM2. The lower dielectric layer BD3 may be planarized through a chemical mechanical polishing process. The lower dielectric layer BD3 is, for example, silicon oxide. After that, a lower dielectric layer BD4 is formed on the lower dielectric layer BD3 and the second lower conductive layer LM2. The lower dielectric layer BD4 may be planarized through a chemical mechanical polishing process. The lower dielectric layer BD4 is, for example, silicon oxide. So far, the fabrication of the lower interconnect structure LIT is completed. However, the embodiments of the present invention are not limited thereto. The formation of the lower interconnect structure LIT is not limited thereto. In other embodiments, the second lower conductive layer LM2 and the plurality of first vias V1 may be formed by a dual damascene process. That is, the dielectric layer BD2' may be formed first. After that, an opening having a trench and a via hole is formed in the dielectric layer BD2'. Afterwards, the barrier material and the conductive material are filled in the opening to simultaneously form the second lower conductive layer LM2 and the plurality of first vias V1. The conductive material is, for example, tungsten. The barrier material is, for example, titanium, titanium nitride, tantalum, tantalum nitride, or a combination thereof. In addition, the lower interconnect structure LIT may include more lower conductive layers and lower dielectric layers.

Referring to FIG. 2J and FIG. 3D, next, a plurality of memory arrays 10 and a plurality of slit structures SLT are formed on the lower dielectric layer BD4. The memory array includes a gate stack structure GSK. The gate stack structure GSK in the staircase region SR has a plurality of staircase structures SC, and the staircase structures SC are covered by the dielectric layer MD (as shown in FIG. 2J). The memory array further includes a plurality of charge storage structures 40, a plurality of channel pillars 16, a plurality of source pillars 32a and a plurality of drain pillars 32b. The plurality of channel pillars 16, the plurality of source pillars 32a and the plurality of drain pillars 32b extend through the gate stack structure GSK of the memory array region AR between the plurality of staircase structures SC. The plurality of charge storage structures 40 are located between the plurality of gate layers 38 and the plurality of channel pillars 16. The plurality of slit structures SLT extend in the first direction D1, and divide the gate stack structure GSK into a plurality of sectors. The memory array and the plurality of slit structures SLT may be formed by any known method, which will not be described in detail here.

Referring to FIG. 2J and FIG. 3E, an upper dielectric layer TD0 of the upper interconnect structure UIT is formed on the substrate 48. The upper dielectric layer TD0 covers the memory array in the memory array region AR and the dielectric layer MD in the staircase region SR.

Figure 4:
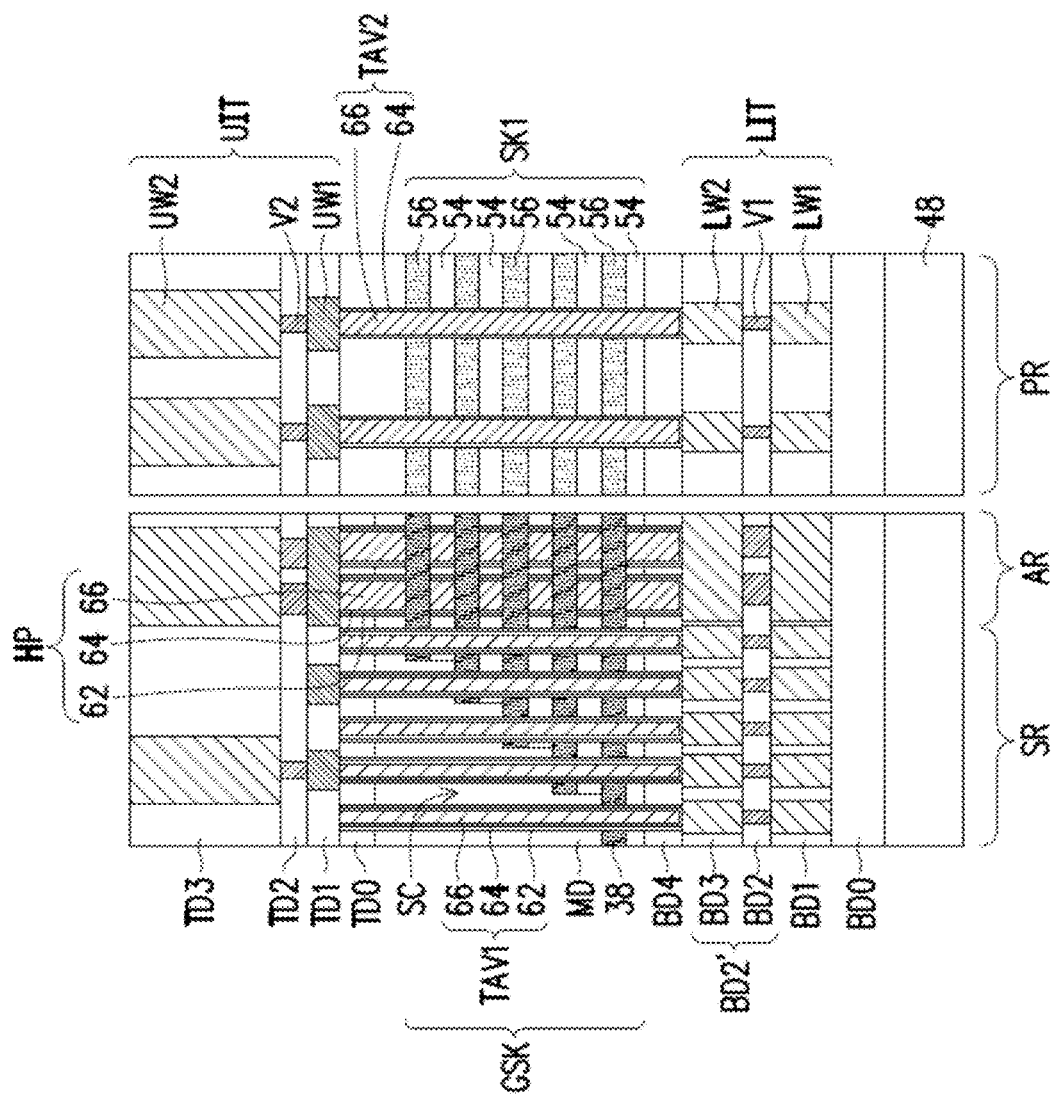
FIG. 4 illustrates various parts of a 3D AND-type NOR flash memory device having a heater according to embodiments of the present technology.

Referring to FIG. 4, the upper dielectric layer TD0 also covers an intermediate stack structure SK1 in the peripheral region PR. The intermediate stack structure SK1 includes a plurality of interlayers 56 and a plurality of insulating layers 54 stacked alternately. The plurality of interlayers 56 in the memory array region AR are then replaced with a plurality of gate layers 38 through a replacement process. The plurality of interlayers 56 in the peripheral region PR are not replaced in the replacement process, and thus remain. The upper dielectric layer TD0 is, for example, silicon oxide.

Referring to FIG. 2J, FIG. 3D and FIG. 4, then, a plurality of vias VAA, a plurality of contacts (not shown), a plurality of conductive pillars HP and a plurality of array vias TAV1, TAV2 (shown in FIG. 4, similar to TAV2 in FIG. 2H) are formed.

Referring to FIG. 2J, the plurality of vias VAA extend through the upper dielectric layer TD0 in the memory array region AR, and land on, and are electrically connected to, the plurality of source pillars 32a and the plurality of drain pillars 32b.

The plurality of contacts (not shown) extend through the upper dielectric layer TD0 and the dielectric layer MD in the staircase region SR, and land on, and are electrically connected to, the ends of the plurality of gate layers 38 of the staircase structure SC.

Referring to FIG. 2J, FIG. 3D and FIG. 4, the array via TAV1 extends through the upper dielectric layer TD0 and the dielectric layer MD in the staircase region SR, the plurality of gate layers 38 and the plurality of insulating layers 54 of the staircase structure SC and the lower dielectric layer BD4. Each array via TAV1 may land on, and be electrically connected to, one of the plurality of conductive lines LW2 of the second lower conductive layer LM2.

Referring to FIG. 4, the plurality of array vias TAV2 extend through the dielectric layer TD0 in the peripheral region PR, the plurality of interlayers 56 and the plurality of insulating layers 54 of the intermediate stack structure SK1, and the lower dielectric layer BD4. Each array via TAV2 may land on, and be electrically connected to, another of the conductive lines LW2 of the second lower conductive layer LM2.

Referring to FIG. 2J, FIG. 3D and FIG. 4, the plurality of conductive pillars HP extend in through array vias through the upper dielectric layer TD0 in the memory array region AR, the plurality of gate layers 38 and the plurality of insulating layers 54 of the gate stack structure GSK and the lower dielectric layer BD4. The plurality of conductive pillars HP land on, and are electrically connected to, the plurality of second lower conductive plates LP2 of the second lower conductive layer LM2.

In some embodiments, the plurality of vias VAA, the plurality of contacts (not shown), and the plurality of array vias TAV2 may include a conductive layer. In other embodiments, the plurality of vias VAA, the plurality of contacts (not shown), and the plurality of array vias TAV2 may include a conductive layer and a barrier layer surrounding the conductive layer. The conductive layer is, for example, tungsten. The barrier layer is, for example, titanium, titanium nitride, tantalum, tantalum nitride, or a combination thereof. Since the plurality of vias VAA, the plurality of contacts (not shown), and the plurality of array vias TAV2 are surrounded by insulating materials (i.e., the upper dielectric layer TD0, the dielectric layer MD, the plurality of interlayers 56 and the plurality of insulating layers 54 of the intermediate stack SK1 and the lower dielectric layer BD4), there is no need to additionally form a liner on the periphery of the conductive layer (or the conductive layer and the barrier layer). The plurality of vias VAA, the plurality of contacts (not shown), and the plurality of array vias TAV2 may be formed simultaneously or individually, and the formation method thereof may be similar to or different from the formation method of the plurality of vias V1.

Referring to FIG. 4, since the plurality of conductive pillars HP and the plurality of array vias TAV1 extend through the plurality of gate layers 38, the plurality of conductive pillars HP, and the plurality of array vias TAV1 includes not only the conductive layer (or the conductive layer 66 and the barrier layer 64) but also a liner 62 electrically insulated from the plurality of gate layers 38. The conductive layer is, for example, tungsten. The barrier layer is, for example, titanium, titanium nitride, tantalum, tantalum nitride, or a combination thereof. The liner is, for example, silicon oxide, silicon nitride, or a combination thereof.

The formation of the plurality of conductive pillars HP and the plurality of array vias TAV1 includes, for example, forming a plurality of openings extending through the upper dielectric layer TD0, the plurality of gate layers 38, the plurality of insulating layers 54 and the lower dielectric layer BD4 in the memory array region AR and the staircase region SR. Next, a lining material, a barrier material and a conductive material are formed in the upper dielectric layer TD0 and the plurality of openings. Afterwards, an etch-back or chemical mechanical polishing process is performed to remove excess lining material, barrier material and conductive material.

Referring to FIG. 2J and FIG. 3E, next, other portions of the upper interconnect structure UIT are formed above the substrate 48. A conductive layer is formed on the upper dielectric layer TD0, and the conductive layer is patterned through lithography and etching processes to form a first upper conductive layer UM1. The first upper conductive layer UM1 includes a plurality of first upper conductive plates UP1 separated from each other, a plurality of local source lines LSL and a plurality of local bit lines LBL, and a plurality of conductive lines UW1. The material of the conductive layer includes metal, such as copper.

The plurality of first upper conductive plates UP1 are located in the memory array region AR, and the plurality of first upper conductive plates UP1 are connected to the plurality of conductive pillars HP. The plurality of local source lines LSL and the plurality of local bit lines LBL are respectively connected to the plurality of source pillars 32a and the plurality of drain pillars 32b through the vias VAA. The plurality of conductive lines UW1 are respectively connected to the plurality of array vias TAV1 in the staircase region SR and the plurality of array vias TAV2 in the peripheral region PR (as shown in FIG. 4).

Referring to FIG. 2J, upper dielectric layers TD1 and TD2 are formed around and on the first upper conductive layer UM1. The upper dielectric layers TD1 and TD2 are, for example, silicon oxide. After that, a chemical mechanical polishing process may be performed to planarize the upper dielectric layers TD1 and TD2 respectively.

Referring to FIG. 2J and FIG. 3F, next, a plurality of second vias V2 are formed in the upper dielectric layer TD2. Portions of the plurality of second vias V2 are connected to the plurality of first upper conductive plates UP1, as shown in FIG. 2J. Other portions of the plurality of second vias V2 are connected to the plurality of local source lines LSL and the plurality of local bit lines LBL, as shown in FIG. 3F. Still other portions of the plurality of second vias V2 are connected to the plurality of conductive lines UW1, as shown in FIG. 3F. The plurality of second vias V2 includes a conductive material, such as tungsten. The formation of the plurality of second vias V2 includes, for example, forming via holes in the upper dielectric layer TD2, and then forming a conductive material on the upper dielectric layer TD2 to fill the via holes. After that, a chemical mechanical polishing process or an etch-back process is performed to remove excess conductive material on the upper dielectric layer TD2.

Referring to FIGS. 2J and 3G, a conductive layer is formed on the upper dielectric layer TD2 and the plurality of second vias V2, and the conductive layer is patterned through lithography and etching processes to form a second upper conductive layer UM2. The second upper conductive layer UM2 includes a plurality of second upper conductive plates UP2 separated from each other, a plurality of global source lines GSL, a plurality of global bit lines GBL and a plurality of conductive lines UW2. The material of the conductive layer includes metal, such as copper. The plurality of second upper conductive plates UP2 are connected to the plurality of first upper conductive plates UP1 through the plurality of second vias V2. The plurality of global source lines GSL and the plurality of global bit lines GBL are respectively connected to the plurality of local source lines LSL and the plurality of local bit lines LBL through the plurality of second vias V2. The plurality of conductive lines UW2 are connected to the plurality of array vias TAV1 and TAV2 through the plurality of second vias V2 and the plurality of conductive lines UW1, respectively.

After that, an upper dielectric layer TD3 is formed on the second upper conductive layer UM2 and the upper dielectric layer TD2, as shown in FIG. 2J. The upper dielectric layer TD3 may be planarized by a chemical mechanical polishing process. The upper dielectric layer TD3 is, for example, silicon oxide. So far, the fabrication of the upper interconnect structure UIT is completed. However, the embodiments of the present invention are not limited thereto. The upper interconnect structure UIT may include more upper conductive layers and upper dielectric layers. In other embodiments, the second upper conductive layer UM2 and the plurality of second vias V2 may be formed by a dual damascene process. In addition, the formation method of the upper interconnect structure UIT is not limited thereto.

Figure 5:
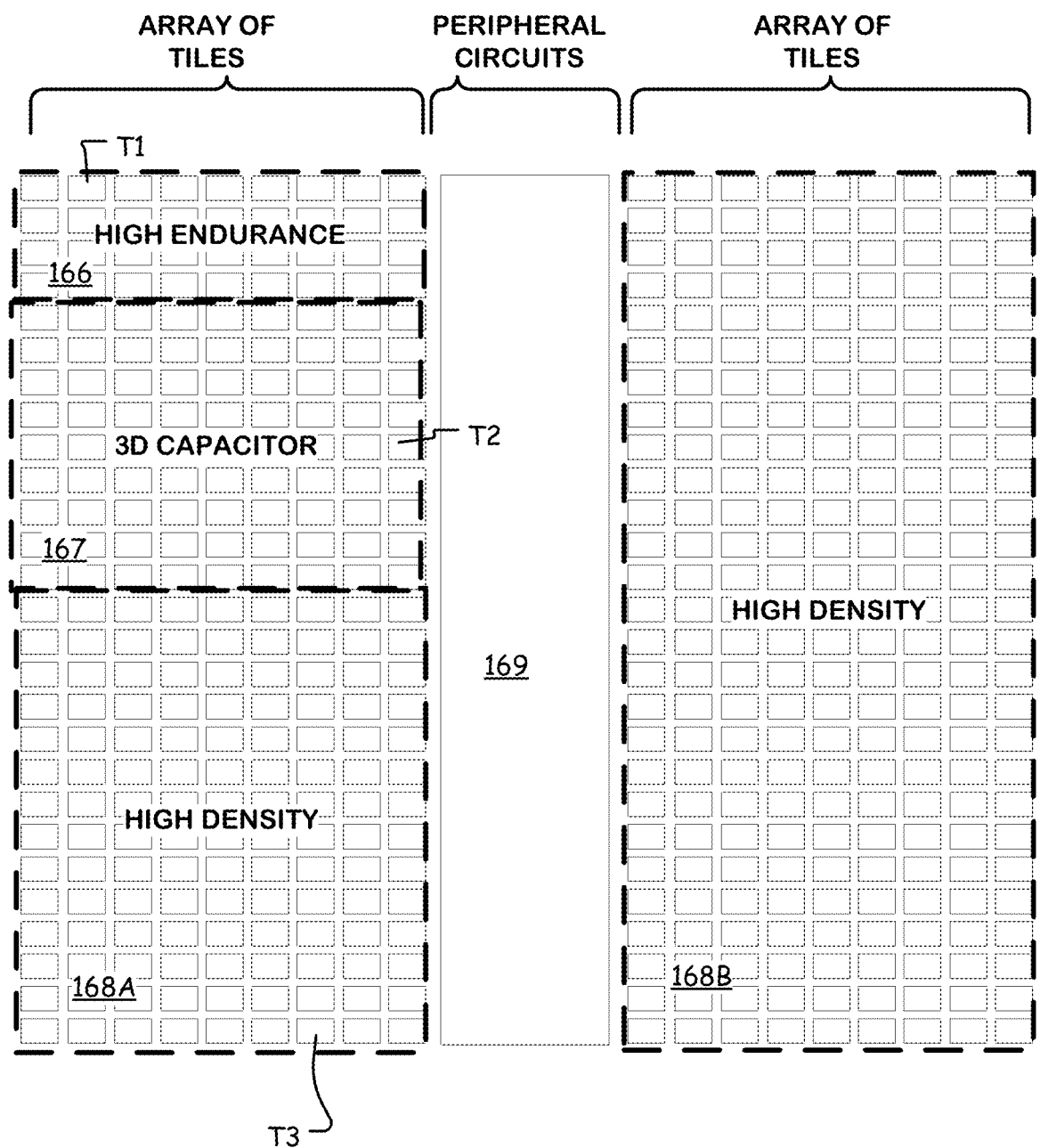
FIG. 5 is a top view of a 3D AND-type NOR flash memory chip according to an embodiment of the present technology.

FIG. 5 is a layout view of a 3D AND-type NOR flash memory chip including a plurality of tiles including three types of tiles: T1, T2 and T3. In this example, the layout includes first and second arrays of tiles on opposite sides of a region 169 which can include peripheral circuits used in operations of the memory. The array of tiles includes a first set of tiles 166 including tiles of type T1 implementing high endurance memory including heater technology as described herein, a second set of tiles 167 including tiles of type T2 implementing a high capacitance, 3D capacitor, and a third set of tiles (168A, 168B) including tiles of type T3 implementing high density memory. Tiles of type T3 may not include heater structures for thermal anneal. In some embodiments, a heater is disposed in both tiles of type T1 and T3, with the heaters in tiles of type T3 having lower density and a different configuration.

The number of first tiles of type T1 in the first set of tiles may be different from the number of second tiles of type T3 in the second set of tiles for each chip.

The tiles of the first type T1 in the first set of tiles may improve the endurance and retention of the memory cell through the arrangement of the heater, so that it may be applied to the user's key status register. In some embodiments wear-leveling techniques can be applied to the tiles of type T3 in the third set of tiles, and not applied to the tiles of type T1 in the first set of tiles.

FIG. 5 illustrates a layout example for an integrated circuit including one or more regular arrays of tiles which can be formed using a stack of alternating insulator and conductor layers, such as used in the formation of 3D AND-type NOR memory cells described herein, and in formation of other types of 3D memories. The layout shown in FIG. 5 illustrates that the tiles of the various types described herein can be arranged on an integrated circuit in a manner suitable for any particular need. Factors which can be considered in the layout of tiles, include size of the necessary capacitors, the size of the high endurance memory, the amount of high density memory required, thermal considerations and layout of power rails on the integrated circuit for efficient distribution of power supply voltages.

Embodiments of the present invention may design a special array for a status register having high durability and retention to record key information for the user.

Figure 6:
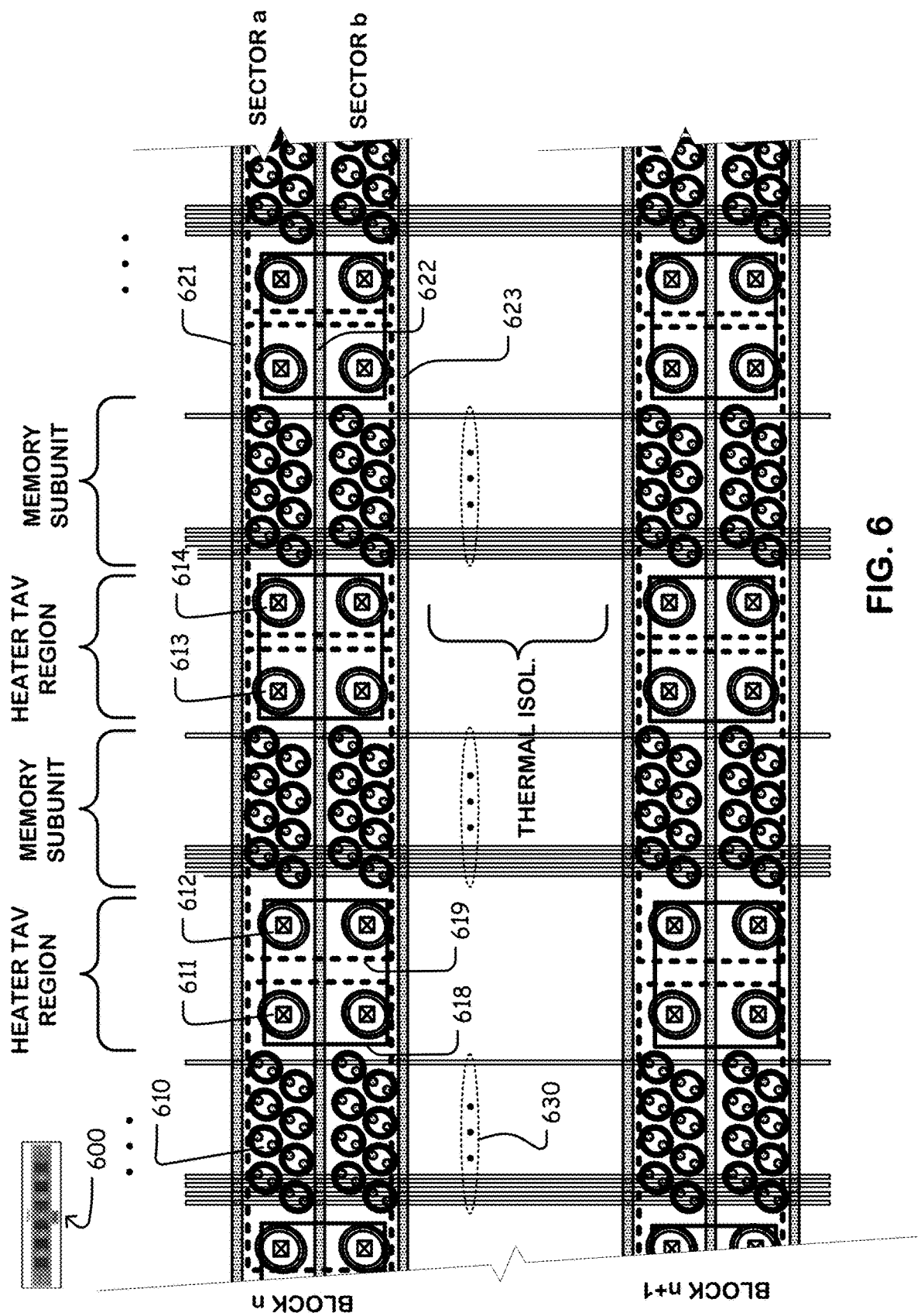
FIG. 6 illustrates a portion of a tile including two adjacent heater blocks according to an embodiment of the present technology.

FIG. 6 illustrates a portion of the tile including two heater blocks BLOCK n and BLOCK n+1, each comprising two sectors SECTOR a and SECTOR b. The sectors are separated by insulating slit structures 621, 622, 623. BLOCK n is separated from BLOCK n+1 by an insulating structure that provides electrical and thermal divisions in the structure. For example, the pitch from the center of BLOCK n to the center of BLOCK n+1 may be greater than 10 µm, such as about 13 µm, in some embodiments. The insulating structure can comprise an inactive structure that does not act a memory. An example inactive structure includes a stack of alternating oxide and nitride layers formed during the formation of the gate stack structure for the heater blocks. For example, the heater blocks may be formed as described above using a procedure that forms alternating silicon oxide and silicon nitride layers. Slits and vias are formed in the oxide/nitride stack to define a structure for the memory tile, and the nitride layers are removed through the slits and vias. The region between the blocks forming insulating structures that provide electrical and thermal divisions between blocks in the structure can be protected from the nitride removal steps by sealing the slits and vias using silicon oxide for example prior to the nitride removal steps. This leaves alternating layers of oxide and nitride in the insulating structure, providing good thermal separation between the heater blocks.

The large pitch (on the order of 10 µm) provides ample space for providing large driver transistors for the purposes of driving heater current to the heater blocks. For example, large driver transistors can be implemented using CMOS under array techniques beneath the oxide/nitride stacks, or other insulating structures, in the regions between the heater blocks.

In the example illustrated in FIG. 6, BLOCK n and BLOCK n+1 include two sectors, where a sector is defined in this example as a gate stack structure that is shared by a plurality of rows of memory columns. In other embodiments, there may be a different number of sectors in each block as discussed above. In this example, there is a plurality of memory subunits disposed along a sector, each memory subunit including eight memory columns (e.g. memory column 610) arranged in two offset rows. Each memory column in this embodiment for a NOR architecture includes a drain pillar, a source pillar and a channel pillar as described above, with memory cells formed at the cross sections of the memory column and the gate layers. A plurality of bit lines and source lines (e.g. 630) overlie and connect to the drain pillars and source pillars for the memory columns in the memory subunits. Also arrayed along the blocks are conductors (e.g. 611, 612, 613, 614) disposed in through array vias, which connect to heater plates (e.g. 618) to the bottom heater plates (e.g. 619 shown in dashed outline). As illustrated, the top heater plates and bottom heater plates extend across the plurality of sectors in the block, so that the plurality of sectors in the block can be heated using a single heater driver circuit.

As illustrated in FIG. 6, a heater block, such as BLOCK n, is represented by a symbol 600 in following figures.

Figure 7:
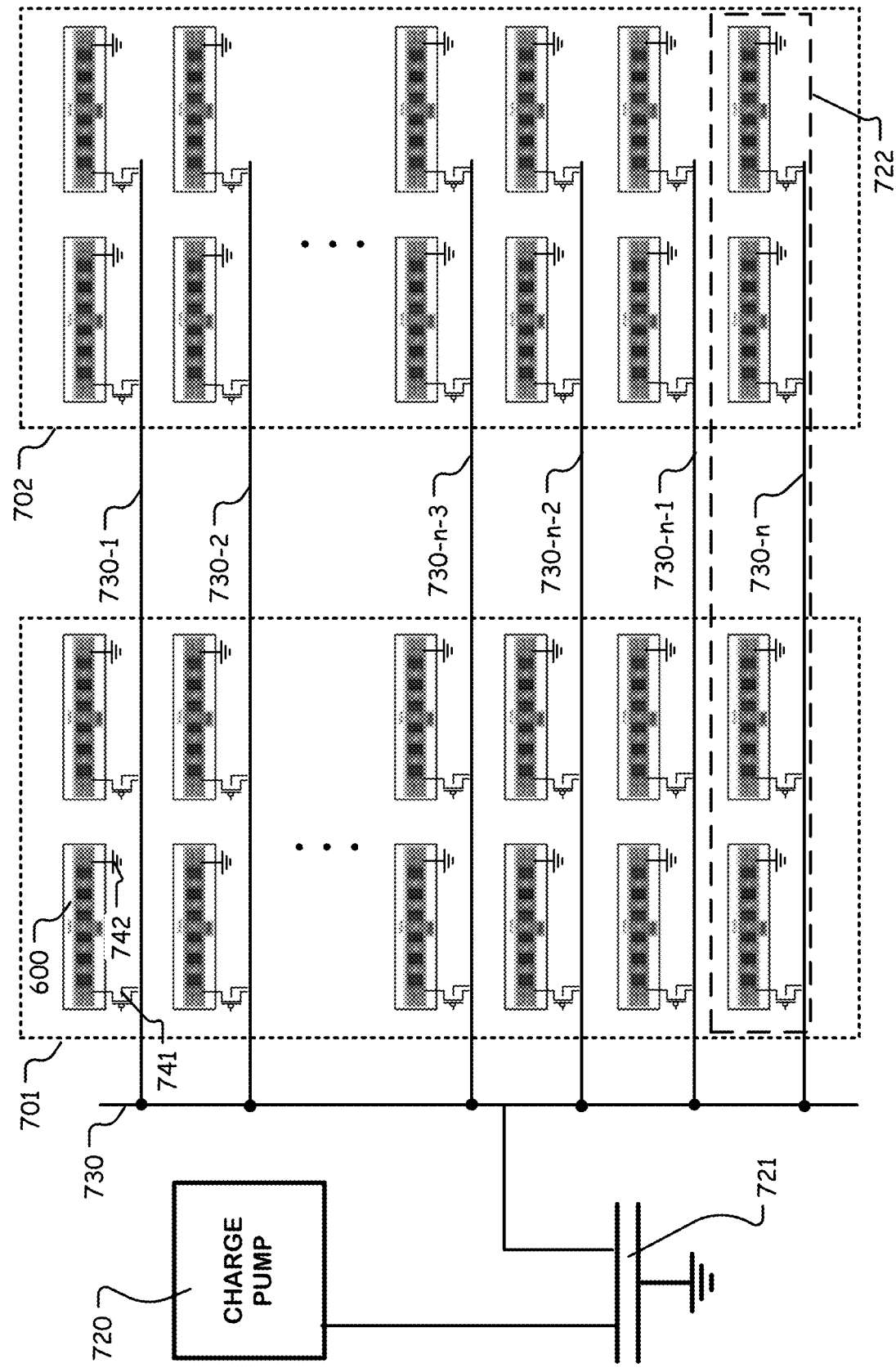
FIG. 7 illustrates an arrangement of tiles including heater blocks and heater drivers according to an embodiment of the present technology.

FIG. 7 illustrates a layout of first and second tiles 701 and 702 of the type including heater blocks 600. Tile 701 includes a plurality of rows, each having two heater blocks. Likewise, tile 702 includes a plurality of rows each having two heater blocks. A heater driver transistor 741 is coupled to each heater block on a top end, and the bottom end of each heater block is coupled to a reference potential such as ground 742. A decoder operating in coordination with the heater driver selects one or more heater blocks by controlling the gate terminal of the heater driver transistor 741. The source terminals of the P type heater driver transistors are coupled to a conductor 730-1 through 730-n corresponding to rows of heater blocks. The conductors 730-1 through 730-n are connected to a conductor 730, which in turn is connected to capacitor 721. The capacitor 721 is coupled to a charge pump 720. In operation, the charge pump is used precharge the capacitor 721. During a heating cycle, a selected heater block is connected to the capacitor 721 by a corresponding conductor and receives current generated by discharge of the capacitor 721.

The number of heater blocks in a given tile can be configured according to thermal considerations involved in spacing the heater blocks, to achieve suitable thermal separation. In a flash memory device, subsections of the memory cells are configured in units that can be erased in parallel. Then in a given implementation, an erase block (e.g. 722) can encompass a plurality of heater blocks (e.g. 600). For example, the erase block 722 encompasses four heater blocks in the row coupled to conductor 730-n.

Figure 8A:
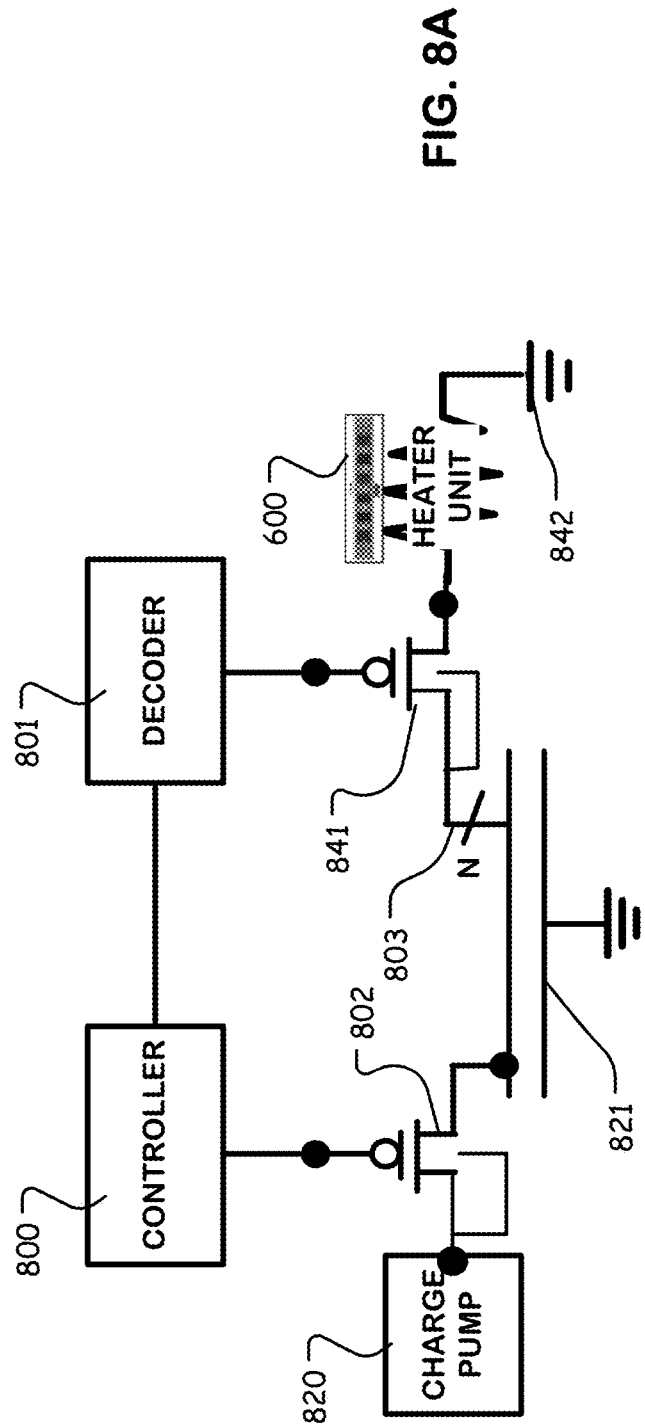
FIG. 8A is a simplified circuit diagram showing a heater driver and control technology.

FIG. 8A is a simplified circuit diagram for a circuit to control heating operations used for thermal anneal in a memory such as that described herein. The circuit includes a controller 800, such as the controller 110 represented in FIG. 1, a charge pump 820 and a capacitor 821. Also, a decoder 801 is coupled to the controller 800. The charge pump 820, which can be implemented on the same chip as the heater blocks, is connected to a precharge transistor 802, such as a p-channel transistor, with its source connected to its body, configured as a pump switch in a circuit to enable the charge pump to precharge the capacitor, by conducting the output of the charge pump during a precharge interval to the capacitor 821. The capacitor 821 is coupled between the drain of the precharge transistor 802 to ground. Also the capacitor 821 is connected via a bus 803 to a plurality of p-channel driver transistors 841. The gates of the driver transistors 841 are controlled by the decoder 801. The sources of the driver transistors 841 are connected to their bodies. The drain of each of the p-channel driver transistors 841 is coupled to a resistive component which is coupled to ground 842 forming a heater unit in a heater block 600. The driver transistor 841 can be disposed within the vertical pitch of the heater blocks, as discussed above, and may be for example a p-channel transistor which is 50 µm wide by 0.65 µm long, capable of driving high current needed in the heating operation and caused by capacitive discharge of the capacitor 821. In other embodiments, the transistors 802 and 841 are n-channel transistors. However, p-channel devices can be preferred because they do not suffer significant body effect losses, and therefore enable more efficient supply of large bias voltages; and they do not suffer degradation due to hot electron damages.

The controller 800 generates timing and control signals in response to addresses and commands, such as erase commands and program commands, which control the precharge transistor 802, the decoder 801 and the driver transistors 841 to execute heater cycles in selected heater blocks. In some embodiments, the controller can respond to commands specifically identifying a heating operation, and apply a heating sequence independent of other operations.

Figure 8B:
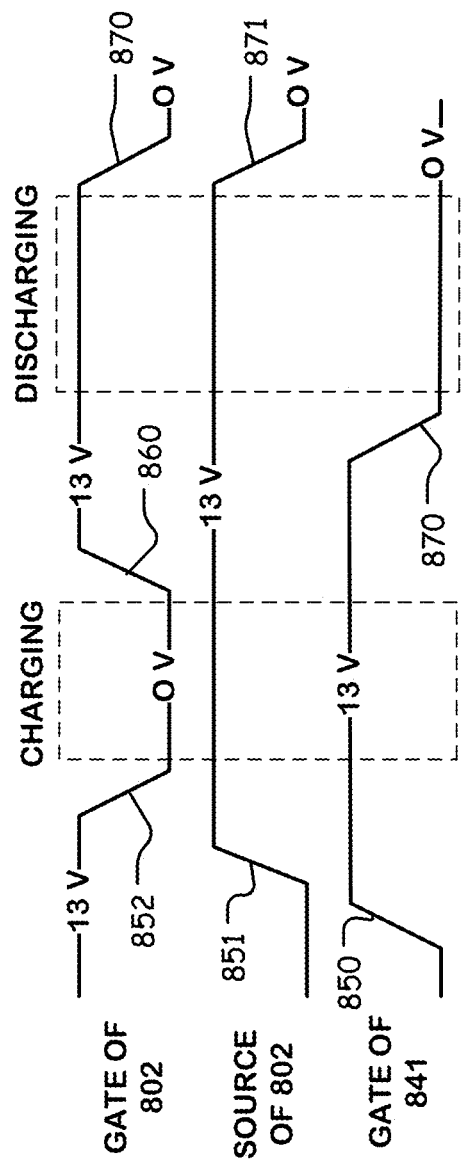
FIG. 8B is a timing diagram for the circuit of FIG. 8A.

FIG. 8B illustrates an example of a timing diagram for the circuit of FIG. 8A. The top trace in FIG. 8B illustrates the voltage on the gate of the precharge transistor 802. The middle trace illustrates the voltage output from the charge pump 820 on the source of the precharge transistor 802. The bottom trace illustrates the voltage on the gate of the driver transistor 841. At the beginning of the timing diagram, the gate of transistor 802 is at high voltage, such as 13 V, so that it is in an off condition. The source of the transistor 802 can be a lower voltage, such as 0 V. The gate of the driver transistor 841 can be at a low-voltage. In the heating cycle illustrated in FIG. 8B, the gate of the driver transistor 841 transitions to a high-voltage at time 850. This turns off the driver transistor 841, isolating the corresponding heater unit 600 from the super capacitor 821. At time 851, the output of the charge pump 820 is coupled to the source of the precharge transistor 802, driving the source voltage to a high-level, such as 13 V. Shortly thereafter at time 852, the gate of the precharge transistor 802 is lowered to about 0 V, turning on the transistor to apply charging current to the super capacitor 821. At time 860, the gate of the precharge transistor 802 is driven to a high-voltage, turning off the transistor. In the interval between transition 852 and transition 860, the super capacitor 821 is charging. After time 860, the gate of the driver transistor 841 transitions to a low-voltage at time 870. This turns on the driver transistor 841, starting an interval in which the super capacitor 821 is discharging. This results in applying capacitive discharge current to the heater unit 600. After the discharging interval, at time 870 the voltage on the gate of the precharge transistor 802 can be lowered to about 0 V. Likewise, at time 871, the output of the charge pump 820 on the source of the precharge transistor 802 can fall to a low-voltage.

Figure 9:
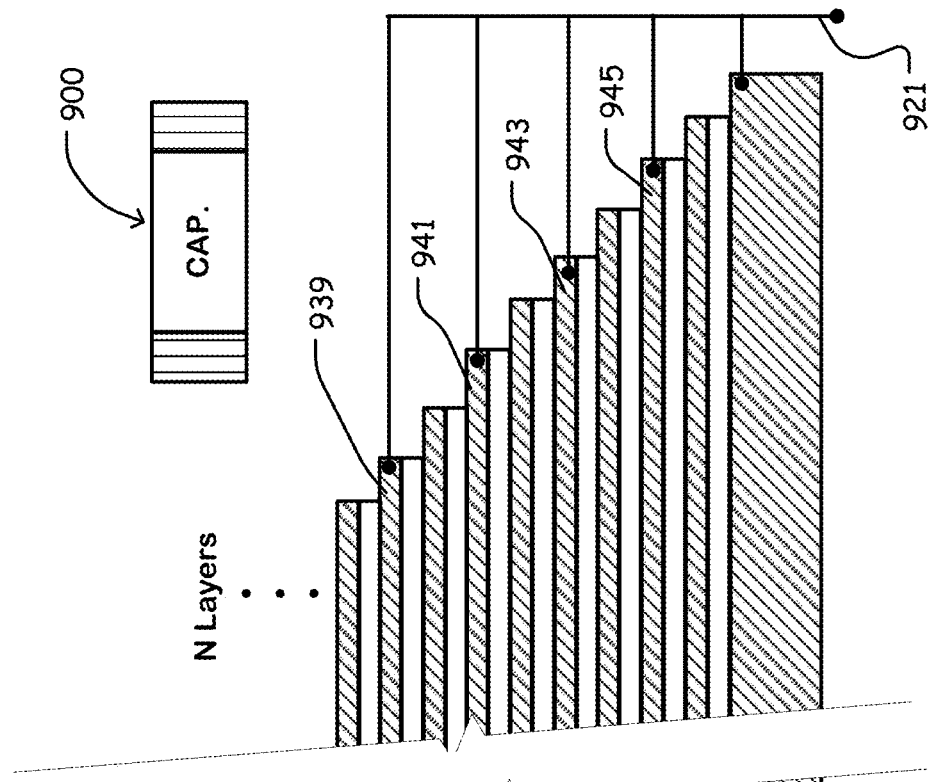
FIG. 9 is a cross-section view of a tile arranged as a capacitor suitable for use in a heater driver as described herein.

FIG. 9 illustrates a capacitor implemented using a gate stack structure like that used in the formation of the memory cells described herein. Thus, the capacitor includes a plurality of conductor layers 938 to 946, formed over a base conductor plate 910. Conductor layers 938, 940, 942, 944 and 946 are connected together to form a first capacitor plate 920. Conductor layers 939, 941, 943, 945 are interleaved with the conductor layers 938, 940, 942, 944 and 946, and connected together and to the base plate 910 to form a second capacitor plate 921. Staircase structures are implemented on opposing sides of the stack, and provide landing areas for conductors used to interconnect the plates as described. In an example implementation, each capacitor tile, such as illustrated in FIG. 5 is formed using the structure of FIG. 9. The structure can be represented by the symbol 900 illustrated in FIG. 9.

Figure 10:
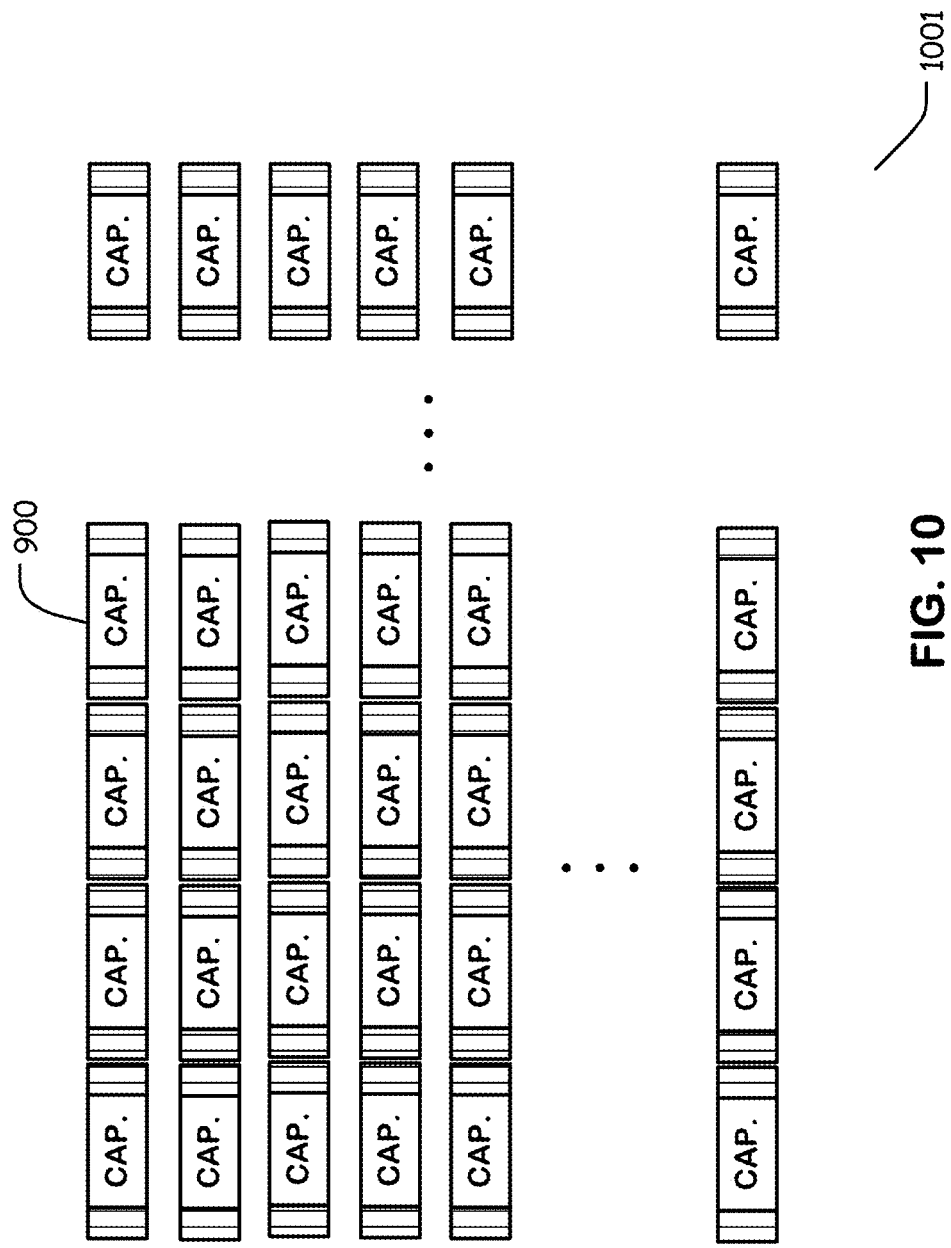
FIG. 10 is a layout view of a high capacitance implementation of the capacitor including a plurality of tiles suitable for use in a heater driver as described herein.

FIG. 10 illustrates that tiles (e.g. tile 900) implementing a 3D capacitor such as shown in FIG. 9 can be arrayed on an integrated circuit, and coupled together to form a high capacitance structure 1001. In example embodiments, the 3D capacitors are implemented having a capacitance greater than 10 nF, and in some embodiments having a capacitance greater than 30 nF, as needed to generate the drive current for the heater blocks according to a given implementation.

A heater structure, such as illustrated above can be implemented having a resistance of about 850 ohms, or between about 600 ohms and 1000 ohms, for one heater block.

Figure 11:
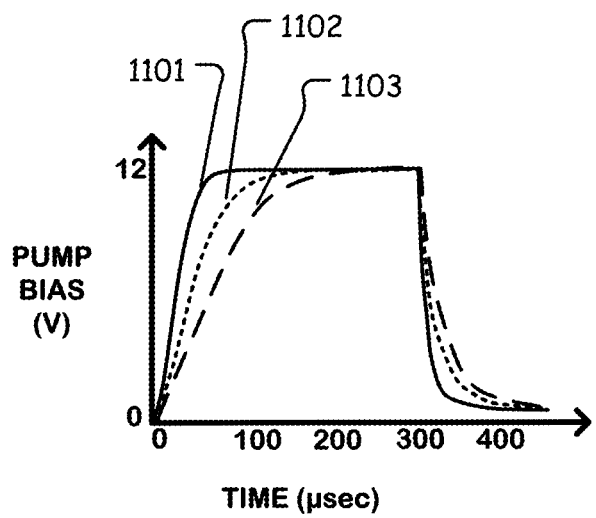
FIG. 11 is a graph showing charge pump bias versus time during a charge up cycle for a capacitor for different capacitance levels in a heater driver as described herein.

FIG. 11 is a graph of a representative voltage on the output of a pump switch transistor, such as transistor 802 of FIG. 8, for precharge of the capacitor (e.g. 821) assuming a heater resistance of 850 ohms. In the graph, a first trace (solid line 1101) represents the precharge voltage for a 10 nF capacitor. A second trace (small dash line 1102) represents the precharge voltage for a 20 nF capacitor. A third trace (large dash line 1103) represents the precharge voltage for a 30 nF capacitor. While the actual speed depends on the drive power of the charge pump, in this example a 10 nF capacitor can reach precharge levels in less than 100 μs. A 20 nF capacitor can reach precharge levels in about 150 μs. A 30 nF capacitor can reach precharge levels in about 200 μs. The controller will turn on the pump switch transistor at time "0", and turn off the pump switch transistor after the precharge levels are reached for a given embodiment. Thus, in this example a precharge cycle for a capacitor used in capacitive discharge current heating can range for example, from 100 us to 400 μs.

Figure 12:
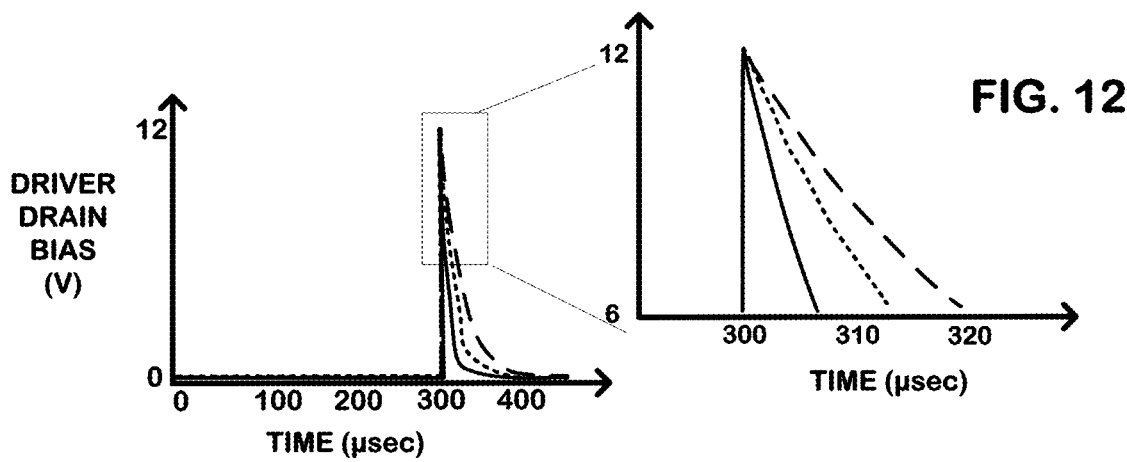
FIG. 12 is a graph showing a heater driver output applied to a heater terminal driven by discharge of a capacitor for a different capacitance level as described herein.

FIG. 12 is a graph of representative voltage versus time for the output of the heater driver transistor, such as transistor 841 in FIG. 8, for the example having an 850 ohm resistance in the heater unit and capacitance levels of 10 nF (solid line), 20 nF (small dash line) and 30 nF (large dash line), with the switch on the gate of the heater driver transistor occurring at 300 μs. An expanded view of the top of the peak at 300 us is shown for voltages between about 6 V and 12 V. As seen, the 10 nF capacitor line discharges more quickly than the 30 nF capacitor line. Thus the larger capacitor is capable of delivering a higher average current over a given period of time.

Figure 13:
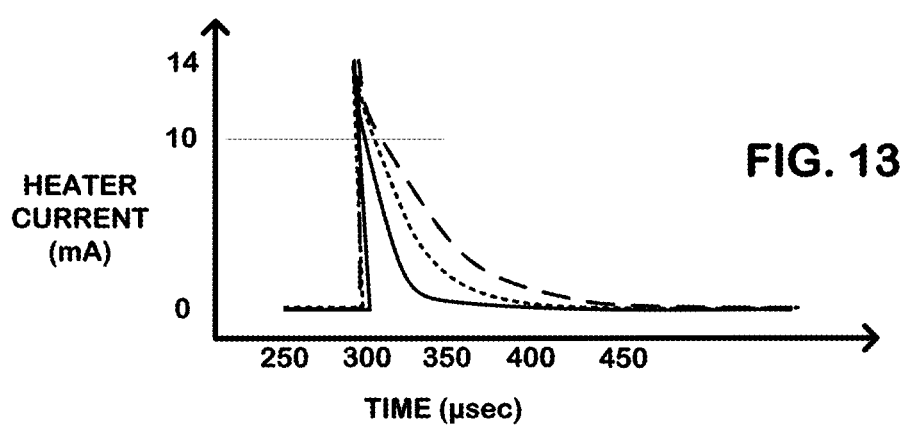
FIG. 13 is a graph of heater current versus time response to the output of the heater driver for various capacitor levels in an example heater embodiment.

FIG. 13 is a graph of heater current versus time in the same example with the switch on the gate of the heater driver transistor occurring at 300 μs. As illustrated, the heater current peaks rapidly at 300 us and then falls off as a function of the capacitance and resistance as discussed above.

Assuming that it is desirable to execute a heating cycle in 10 us or less, the amount of power delivered can be represented by the integral over 10 us following turn on at the 300 us point. In the example illustrated a 30 nF capacitor can maintain greater than 10 mA currents for 10 μs, generating significant power to drive a heater block implemented as described herein. For example, the temperature of about 400° C. can be readily achieved with 12 V input pulse operation in time durations on the order of 10 us in implementations of the heater unit.

Figure 14:
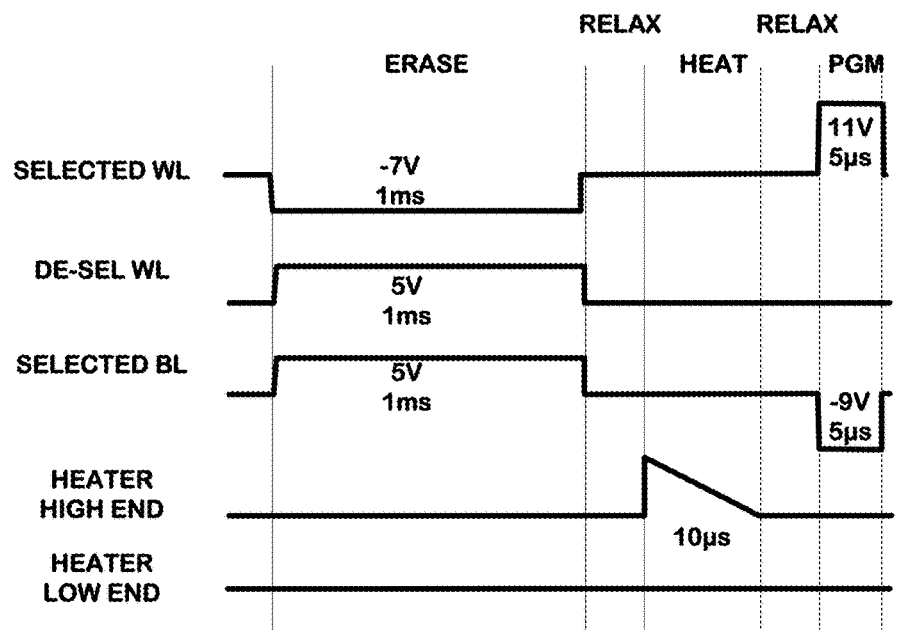
FIG. 14 is a timing diagram for a memory including a heater cycle after an erase pulse and preceding a program pulse.
Figure 15:
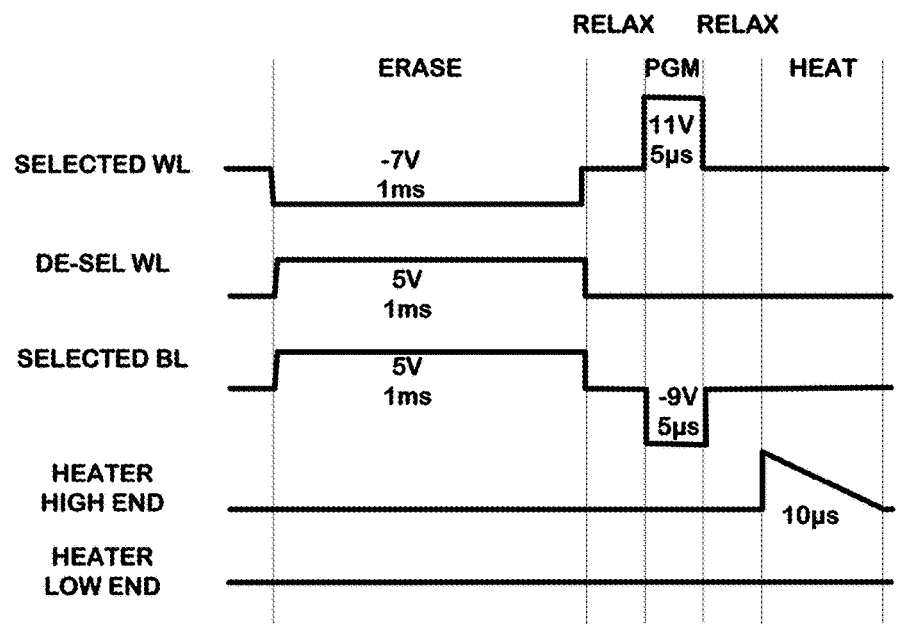
FIG. 15 is a timing diagram for a memory operation including a heater cycle after a program pulse that follows an erase pulse.
Figure 16:
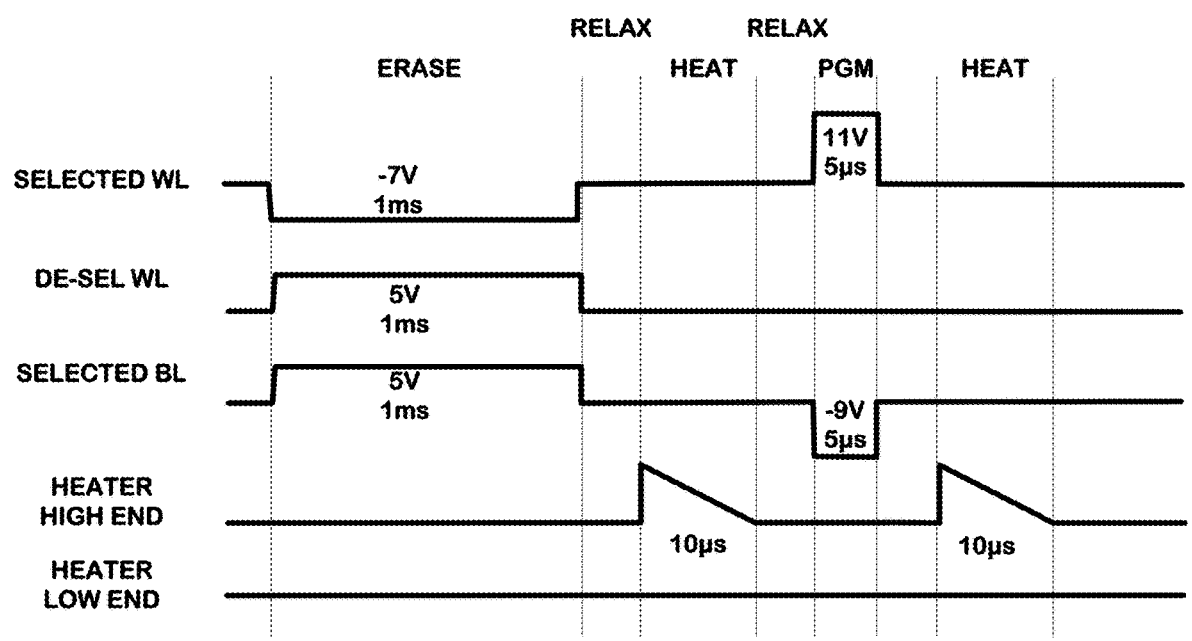
FIG. 16 is a timing diagram for a memory including a first heater cycle after an erase pulse and preceding a program pulse, and a second heater cycle after the program pulse.

FIGS. 14 to 16 are timing diagrams illustrating methods of operating a memory device with capacitive discharge heating. In a 3D AND-type NOR architecture, a memory operation is executed using a state machine or other circuitry in the controller of the integrated circuit in response to commands and addresses. The timing diagrams illustrate a voltage on a selected word line, a deselected word line and a selected bit line for the execution of the erase operation and a following program operation. Also, the timing diagram illustrates a capacitive discharge heating pulse following the erase step of the operation.

As shown in FIG. 14, for example, a memory operation begins with an erase operation applying negative 7 V for 1 ms on the selected word line, positive 5 V for 1 ms for de-selected word lines, and positive 5 V for 1 ms to the selected bit line. After a relaxation interval which can be about 10 us for example (not to scale), capacitive discharge heating is executed capturing the peak of the capacitive discharge for about 10 μs. After the heating interval, a program pulse is applied including about 11 V on the selected word line for 5 μs, 0 V on the de-selected word lines, and about minus 9 V on selected bit lines.

Thus, the method of operating includes applying an erase pulse to erase a block of the memory, followed by applying capacitive discharge heating to heater blocks in the erase block in timing coordination with, or otherwise triggered by, the erase operation to erase the group of memory cells in the heater block. If there is more than one heater block in an erase block, multiple capacitive discharge heating pulses can be applied in sequence. In some embodiments, more than one capacitive discharge circuit can be implemented to allow capacitive discharge heating of more than one heater block in an erase block in parallel. Following the capacitive discharge heating, a program pulse (or a sequence of pulses) is applied to the selected memory cells to be programmed. After the programming pulse, the example operation is complete.

FIG. 15 illustrates an example in which the capacitive discharge heating follows the program operation. Thus, in the example of FIG. 15, a memory operation begins with an erase operation applying negative 7 V for 1 ms to the selected word line, positive 5 V for 1 ms for de-selected word lines, and positive 5 V for 1 ms to the selected bit line. After a relaxation interval, a program pulse is applied including about 11 V on the selected word line for 5 µs, 0 V on the de-selected word lines, and about minus 9 V on selected bit lines. After a relaxation interval which can be about 10 us for example (not to scale), capacitive discharge heating is executed capturing the peak of the capacitive discharge for about 10 µs.

Thus, the method of operating includes applying an erase pulse to an erase block of the memory, followed by a program pulse (or a sequence of pulses) applied to the selected memory cells to be programmed. After the programming pulse, the operation includes applying capacitive discharge heating to heater blocks in the erase block in timing coordination with, or otherwise triggered by, the erase operation to erase the group of memory cells in the heater blocks. If there is more than one heater block in an erase block, multiple capacitive discharge heating pulses can be applied in sequence. In some embodiments, more than one capacitive discharge circuit can be implemented to allow capacitive discharge heating of more than one heater block in an erase block in parallel.

As shown in FIG. 16, for example, a memory operation begins with an erase operation applying negative 7 V for 1 ms to the selected word line, positive 5 V for 1 ms for de-selected word lines, and positive 5 V for 1 ms to the selected bit line. After a relaxation interval which can be about 10 us for example (not to scale), capacitive discharge heating is executed capturing the peak of the capacitive discharge for about 10 µs. After the heating interval, a program pulse is applied including about 11 V on the selected word line for 5 µs, 0 V on the de-selected word lines, and about minus 9 V on selected bit lines. After a relaxation interval which can be about 10 us for example (not to scale), capacitive discharge heating is executed, again, capturing the peak of the capacitive discharge for about 10 µs.

Thus, the method of operating includes applying an erase pulse to an erase block of the memory, followed by applying capacitive discharge heating to heater blocks in the erase block in timing coordination with, or otherwise triggered by, the erase operation to erase the group of memory cells in the heater block. If there is more than one heater block in an erase block, multiple capacitive discharge heating pulses can be applied in sequence. In some embodiments, more than one capacitive discharge circuit can be implemented to allow capacitive discharge heating of more than one heater block in an erase block in parallel. Following the capacitive discharge heating, a program pulse (or a sequence of pulses) is applied to the selected memory cells to be programmed. After the programming pulse, the operation includes applying a second capacitive discharge heating pulse to heater blocks in the erase block. More than one capacitor can be used to apply the heating discharge pulses in quick succession, to avoid the precharge time required for one capacitor. If there is more than one heater block in an erase block, multiple capacitive discharge heating pulses can be applied in sequence. In some embodiments, more than one capacitive discharge circuit can be implemented to allow capacitive discharge heating of more than one heater block in an erase block in parallel.

A method is provided for operating a memory device which includes heater blocks having resistive components acting as heaters, and thermal communication with corresponding sets of groups of memory cells, such as described herein. The method includes executing an erase operation, followed by a heating cycle based on capacitive discharge heating. In embodiments of the technology, the method can include applying a heating cycle for each erase operation of a heater block. The heating cycle can occur between an erase pulse to an erase block of the memory and a program pulse for memory cells in the erase block. The heating cycle can occur after an erase pulse is applied to an erase block and after the program pulse for memory cells in the erase block, but before a following erase of the erase block. In other embodiments, more than one heating cycle can be applied between erase pulses of a given erase block. For example, a heating cycle can occur both between an erase pulse for the erase block and a program pulse for memory cells of the erase block, and a heating cycle can occur after the program pulse to the memory cells of the erase block.

A method of operation can include applying heating cycles to heater blocks in timing coordination with, or otherwise triggered by, erase operations of the memory, such as, between erase operations of a given erase block, after each erase operation affecting a given heater block. Alternatively, or in addition, a heating procedure can be executed that involves applying heating cycles in a pattern across the array of heater blocks during idle times for the memory, or applying heating operations interleaved with normal operations of the memory in a periodic sequence, in which more than one erase operation may occur in a given erase block between heating cycles.

A technology is described that uses capacitive discharge current to drive heater units in heater blocks of memory cells in a nonvolatile memory, such as 3D AND-type NOR flash. Using capacitive discharge, it is unnecessary to design a huge charge pumping circuit to offer high-voltage high current pulses required for thermal anneal in a reasonable amount of time. One can design a regular charge pumping circuit which generates about ~13V with ~2 mA supply current can be implemented on the integrated circuit, and used for pre-charging a large capacitor in reasonable time intervals, such as less than 200 µs. The capacitive discharge of the large capacitor can provide the necessary current. The technology described herein can offer a large peak current and voltage for the heater in heater blocks of the memory by capacitive discharge without creating some of the difficult design issues relating to providing chip power.

A technology is provided that enables thermal anneal using capacitive discharge in about 10 us per pulse, by which endurance of the memory cells in the heater blocks is essentially improved. For example, endurance of greater than 10 million program/erase cycles is expected. In some embodiments, endurance on the order of 1 billion program/erase cycles may be achieved.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory, comprising:
an array of memory cells;
a resistive component disposed in thermal communication with a group of memory cells in the array of memory cells, the group of memory cells including multiple three-dimensional (3D) stacks of memory cells having multiple levels;
a capacitor;
a circuit to cause discharge of the capacitor via the resistive component; and
a decoder to connect the capacitor to selected resistive components of a plurality of resistive components including the resistive component,
wherein the resistive component includes upper heating plates located above the 3D stacks of memory cells, lower heating plates located below the 3D stacks of memory cells and conductive vertical pillars connecting the upper heating plates to the lower heating plates, wherein an arrangement of the upper heating plates, the lower heating plates and the conductive vertical pillars provides a single continuous snake-shaped heating element to provide heat to each 3D stack of memory cells of the group of memory cells in thermal communication with the resistive component.

2. The memory of claim 1, further comprising:
a charge pump; and
a circuit to enable the charge pump to precharge the capacitor.

3. The memory of claim 1, including a plurality of groups of memory cells in the array of memory cells, including the group of memory cells, wherein each of the plurality of resistive components is disposed in thermal communication with respective groups of memory cells of the plurality of groups of memory cells.

4. The memory of claim 1, wherein the capacitor has a capacitance greater than 10 nF.

5. The memory of claim 1, including a controller configured to execute erase operations for memory cells in the array, and to control the circuit to enable discharge of the capacitor to induce current in the resistive component of the group of memory cells in timing coordination with an erase operation to erase the group of memory cells.

6. The memory of claim 1, wherein the group of memory cells is disposed in a specific block of the array of memory cells, the specific block including one or more segments, each segment including a plurality of word line layers and a plurality of bit line pillars disposed through the plurality of word line layers.

7. The memory of claim 1, including a plurality of groups of memory cells including the group of memory cells, the groups in the plurality of groups disposed in respective specific blocks in a plurality of specific blocks of the array of memory cells, each specific block including one or more segments, each segment including a plurality of word line layers and a plurality of bit line pillars disposed through the plurality of word line layers.

8. The memory of claim 7, wherein the plurality of specific blocks are arranged in rows having a first width orthogonal to the rows, with inactive structures between the rows having a second width greater than five times the first width.

9. The memory of claim 7, wherein segments in the plurality of specific blocks are arranged in rows having a first width orthogonal to the rows, with inactive structures between the rows having a second width greater than ten times the first width.

10. The memory of claim 7, wherein the array includes a plurality of erase blocks configured for block erase operations, and wherein a particular erase block in the plurality of erase blocks includes more than one specific block in the plurality of specific blocks.

11. The memory of claim 7, wherein each of the plurality of resistive components is disposed in thermal communication with respective groups of memory cells in the plurality of groups of memory cells.

12. The memory of claim 7, wherein the capacitor comprises a plurality of layers of conductors separated by insulating layers, with conductors in layers in the plurality of layers connected to form a first terminal of the capacitor interleaved with conductors in layers in the plurality of layers connected to form a second terminal of the capacitor.

13. The memory of claim 12, wherein the plurality of specific blocks and the capacitor are disposed on a single integrated circuit chip.

14. The memory of claim 1, wherein the group of memory cells and the capacitor are disposed on a single integrated circuit chip.

15. A method for operating a memory, the memory including a plurality of groups of memory cells, the method comprising:
charging a capacitor;
using a decoder to select a group of memory cells of the plurality of groups of memory cells, the selected group of memory cells including multiple three-dimensional (3D) stacks of memory cells having multiple levels; and
applying discharge current from the capacitor to a resistive component in thermal communication with the selected group of memory cells,
wherein the resistive component includes upper heating plates located above the 3D stacks of memory cells, lower heating plates located below the 3D stacks of memory cells and conductive vertical pillars connecting the upper heating plates to the lower heating plates, wherein an arrangement of the upper heating plates, the lower heating plates and the conductive vertical pillars provides a single continuous snake-shaped heating element to provide heat to each 3D stack of memory cells of the group of memory cells in thermal communication with the resistive component.

16. The method of claim 15, including:
executing an erase operation to erase the selected group of memory cells; and
applying the discharge current in timing coordination with the erase operation.

17. The method of claim 15, including:
executing an erase operation to erase the selected group of memory cells; and
the applying of the discharge current triggered by the erase operation.

18. A memory, comprising:
an array of memory cells including a plurality of groups of memory cells, the groups in the plurality of groups being disposed in respective specific blocks in a plurality of specific blocks of the array of memory cells, each specific block including one or more segments, each segment including a plurality of word line layers and a plurality of bit line pillars disposed through the plurality of word line layers;

a resistive component disposed in thermal communication with a group of memory cells of the plurality of groups of memory cells;

a capacitor; and a circuit to cause discharge of the capacitor via the resistive component, wherein, at least one of (i) the plurality of specific blocks are arranged in rows having a first block width orthogonal to the rows of specific blocks, with inactive structures between the rows of specific blocks having a second block width greater than five times the first block width and (ii) segments in the plurality of specific blocks are arranged in rows having a first segment width orthogonal to the rows of segments, with inactive structures between the rows of segments having a second segment width greater than ten times the first segment width.

* * * * *